(12) United States Patent
Koike et al.

(10) Patent No.: US 6,358,115 B1
(45) Date of Patent: Mar. 19, 2002

(54) DICING APPARATUS

(75) Inventors: Shigemitsu Koike; Masayuki Inai; Hirokazu Kobayashi; Toshimichi Shimizu, all of Tokyo (JP)

(73) Assignee: Taiyo Yuden Co. Ltd., Tokyo (JP)

( * ) Notice: Subject to any disclaimer, the term of this patent is extended or adjusted under 35 U.S.C. 154(b) by 0 days.

(21) Appl. No.: 09/456,123

(22) Filed: Dec. 7, 1999

(30) Foreign Application Priority Data

Dec. 9, 1998 (JP) .......................................... 10-350069

(51) Int. Cl.$^7$ ............................. B24B 49/00; B24B 1/00
(52) U.S. Cl. ................................ 451/5; 451/6; 451/41; 451/213; 451/221; 125/13.01
(58) Field of Search ................................ 451/5, 28, 41, 451/199, 212, 213, 221, 6, 8; 125/13.01

(56) References Cited

U.S. PATENT DOCUMENTS

| | | | | |
|---|---|---|---|---|
| 4,569,326 A | * | 2/1986 | Tanizaki et al. | 125/13 |
| 5,353,551 A | * | 10/1994 | Nishida | 451/5 |
| 5,605,489 A | * | 2/1997 | Gale et al. | 451/28 |
| 5,641,714 A | * | 6/1997 | Yamanaka | 438/14 |
| 5,832,585 A | * | 11/1998 | Takiar et al. | 29/424 |
| 6,095,899 A | * | 8/2000 | Elmar et al. | 451/28 |
| 6,105,567 A | * | 8/2000 | Sun et al. | 125/13.01 |
| 6,165,232 A | * | 12/2000 | Tiebar et al. | 29/25.01 |
| 6,173,750 B1 | * | 1/2001 | Davis et al. | 156/584 |

FOREIGN PATENT DOCUMENTS

JP     60214911     10/1985

* cited by examiner

Primary Examiner—M. Rachuba
(74) Attorney, Agent, or Firm—Rosenman & Colin, LLP.

(57) ABSTRACT

A dicing apparatus is provided with a first position for feeding a workpiece before dicing, a movable machining table capable of retaining the workpiece, a second position for mounting the workpiece before dicing on the machining table, a third position for washing the diced workpieces, a fourth position for retaining the washed workpieces, a dicing mechanism provided at a dicing range spaced apart from the second position, for dicing the workpiece, and a transferring mechanism for transferring the workpiece from the first position to the second position, from the second position to the third position, from the third position to fourth position, respectively. The first to the fourth positions are disposed so as to be circumferentially, equally spaced apart from each other by 90 degrees, and the workpiece transferring mechanism has three rotating arms which in conjunction with each other, form a substantial "T" shape, and at its central portion a shaft for pivoting the rotating arms, each of the rotating arms being provided with a suction head for holding the workpiece.

13 Claims, 17 Drawing Sheets

DICING APPARATUS

FIELD OF THE INVENTION

The present invention relates to a dicing apparatus; and, more particularly, to a dicing apparatus for dicing a workpiece such as a ceramic multilayer or a semiconductor wafer.

DESCRIPTION OF THE PRIOR ART

There is disclosed in Japanese Patent Laid-Open Publication No. Sho 60-214911 an apparatus for dicing a semiconductor wafer or an integrated circuit wafer into numerous individual chips.

The dicing apparatus is provided with a first position where wafers supplied are aligned, a second position where the aligned wafers are loaded on a table before being diced, a third position where the diced wafers are washed, a fourth position where the washed wafers are stored, and a dicing tool in a dicing station for cutting the wafers on the table into individual chips, the dicing station being spaced apart from the second position. The first through fourth positions are located at four corners of a square, respectively. A cross-shaped rotating arm having a rotating shaft at a center of the square moves the wafers between the positions next to one another. Four lead portions of the cross-shaped rotating arm are, respectively, provided with suction heads for maintaining the wafer on each thereof.

In the dicing apparatus, however, the wafers can be only moved sequentially between the positions, i.e., they can be moved only from the first position to the second position, from the second position to the third position, and from the third position to the fourth position. In other words, the wafer can not moved from the fourth position to the first position. Accordingly, even in a situation where the maximum number of the wafers are being moved, only three suction heads are utilized rather than all four suction heads, thereby making one of the four heads and one of the rotating arms unnecessary. The presence of one unnecessary suction head and rotating arm in the prior art dicing apparatus unnecessarily complicates the configuration and increases the manufacturing and the maintenance cost thereof.

SUMMARY OF THE INVENTION

It is, therefore, a primary object of the invention to provide a dicing apparatus which is structurally simple, and less expensive to manufacture but has a comparable efficiency with the prior art dicing apparatus.

The above and other objects of the invention are accomplished by providing a dicing apparatus comprising: a first position for feeding a workpiece before dicing; a movable machining table capable of retaining the workpiece; a second position for mounting the workpiece before dicing on the machining table; a third position for washing diced workpieces; a fourth position for retaining the diced workpieces; a dicing mechanism provided at a dicing range spaced apart from the second position, for dicing the workpiece; and a transferring mechanism for transferring the workpiece from the first position to the second position, from the second position to the third position, from the third position to fourth position, respectively, wherein the first to the fourth positions are disposed so as to be circumferentially, equally spaced apart from each other by 90 degrees, and the workpiece transferring mechanism has three rotating arms which in conjunction with each other, form a substantial "T" shape, and at its central portion a shaft for pivoting the rotating arms, each of the rotating arms being provided with a suction head for holding the workpiece.

In accordance with one aspect of the present invention, a dicing apparatus comprises a machining table capable of retaining workpieces; a dicing mechanism for dicing a workpiece on the machining table; a coolant feeder for feeding a coolant to a working place; at least one discharging member provided at the machining table, for discharging the coolant together with machining remnants, the discharging member having a discharging port; and an eliminator for moving the machining remnants remaining at bottom of the discharging member toward the discharging port of the discharging member. In accordance with another aspect of the present invention, a dicing apparatus comprises a machining table capable of retaining workpieces; a dicing mechanism for dicing a workpiece on the machining table; a camera for detecting a position of the workpiece by imaging the workpiece on the machining table; and a coolant feeder for feeding a coolant to a working place, wherein the camera is provided with a cylindrical lens hood having an opening and at its circumference an intake port, the intake port being connected to an air feeding source for feeding an air from the intake port to an interior of the lens hood and ejecting the air from the opening of the lens hood to outside.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
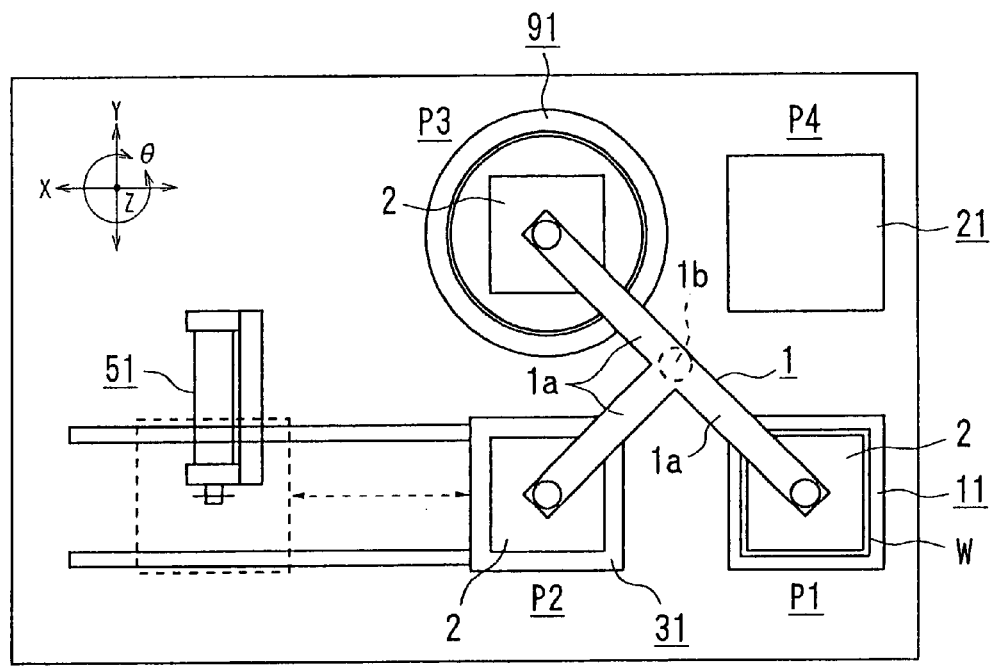
FIG. 1 is a schematic top planar view of a dicing apparatus in accordance with one embodiment of the present invention.
Figure 14:
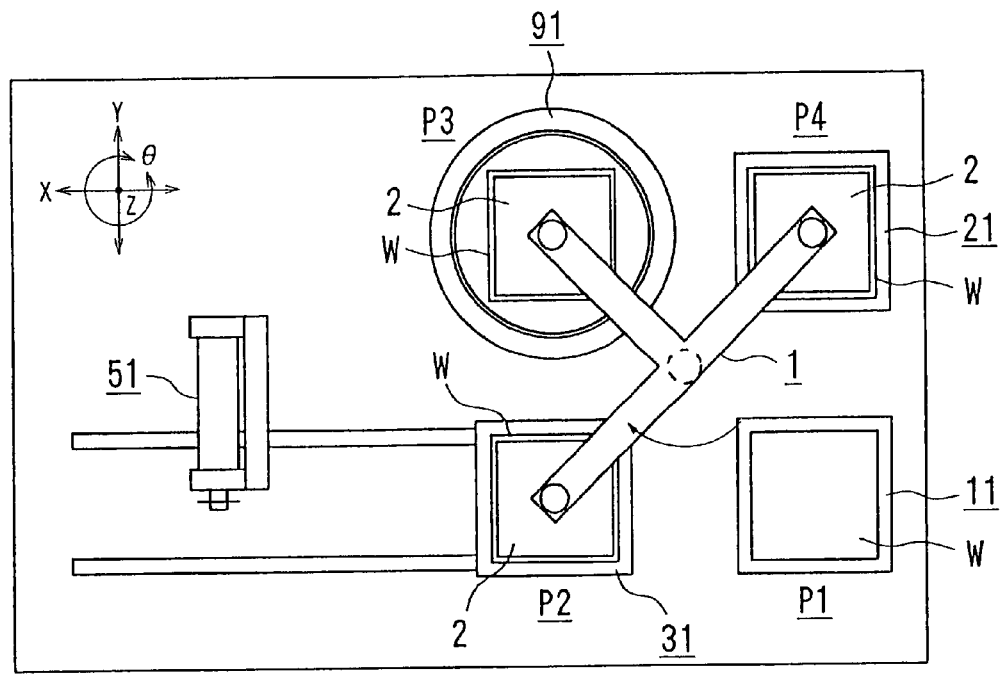

There is shown in FIGS. 1 and 14 one embodiment of the inventive dicing apparatus.

There is shown in FIG. 1 a schematic top planar view of the inventive dicing apparatus. Reference numeral P1 represents a first position for supplying workpieces W before dicing. Reference numeral P2 represents a second position for loading the workpieces W on a table before dicing. Reference numeral P3 represents a third position for washing the workpieces W; and reference numeral P4 represents a fourth position for storing the workpieces W. Reference numeral 1 is a rotating arm moving the workpiece W, reference numeral 11 refers to a workpiece supplier, reference numeral 21 represents a workpiece retainer, reference numeral 31 is the table, reference numeral 51 refers to a dicing head, and reference numeral 91 indicates a workpiece washer.

In the shown apparatus, the workpiece W is a ceramic multilayer of a rectangular shape, to be more specific, to be formed into multilayer type electronic components such as multilayer capacitors, multilayer inductors or multilayer complex components. The ceramic multilayer is formed in such a manner that a plurality of ceramic sheets are laminated on a resin sheet having an adhesive layer and then are pressed together. The ceramic multilayer is then diced into individual chips. The resin sheet is removed from the diced chip prior to being sintered. The sintered chip is formed into a desired multilayer type electronic component by forming appropriate external electrodes thereon.

The first through the fourth positions P1 to P4 are arranged on a same circumferential plane, being angularly separated by 90° in a clockwise direction. A shaft 1b of the rotating arm 1 is centered on the circumferential plane. The rotating arm 1 is provided with three arms 1a having a same length, the three arms forming a T-shape and angularly separated from one another by 90°. A lead portion of each of the arms 1a further includes a suction head 2 for maintaining the workpiece W thereon.

Figure 2:
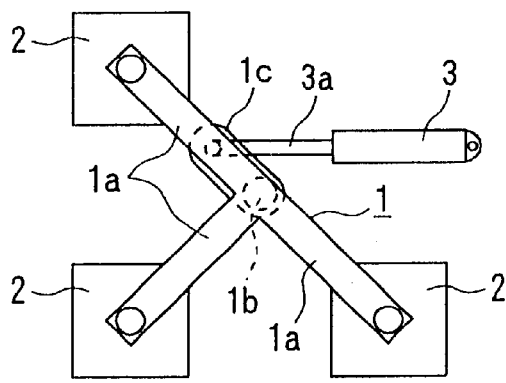
FIG. 2A illustrates a unit for reciprocating and rotating a rotating arm in the inventive dicing apparatus.
FIG. 2B shows a schematic view illustrating how the unit shown in FIG. 2A operates.
Figure 2:
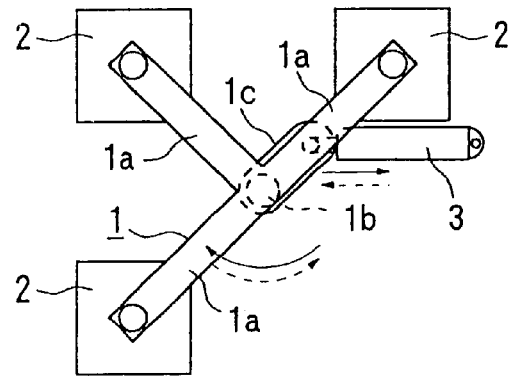

As shown in FIG. 2A, the shaft 1b of the rotating arm 1 is connected to one end of a link 1c, the other end of the link 1c being connected to a rod 3a of a cylinder 3 for driving the rotating arm 1. The rotating arm 1 rotates 90° by a stroke of the rod 1c of the cylinder 3. That is, the rotating arm 1 angularly reciprocates between a position shown in FIG. 2A and a position shown in FIG. 2B in response to the stroke of the rod 1c. In FIG. 2A, the three suction heads 2 stay above the first to the third position P1 to P3, respectively, and the suction heads 2 stay above the second to the fourth position P2 to P4 in FIG. 2B. It can be appreciated that the rotating arm 1 may be rotated by connecting the shaft 1b to a motor.

A lower portion of the suction head 2 is substantially a rectangular shape and has an elastic pad 2a made of a soft resin or a synthetic rubber. Although not shown, the elastic pad 2a is provided with a cross-shaped groove or a parallel groove formed thereinto, whose internal surface including a suction hole. The suction hole communicates with a pneumatic circuit having a vacuum pump and valves. Consequently, the workpiece W is maintained on the elastic pad 2a by applying a negative pressure to the suction hole and released from the elastic pad 2a by releasing the negative air pressure. It should be understood that the three suction heads 2 may have a different configuration from the above. The suction head 2 for moving the workpiece W prior to dicing from the workpiece supplier 11 to the table 31, the suction head 2 for moving the workpiece w after dicing from the table 31 to the workpiece washer 91, and the suction head 2 for moving the workpiece W after washing from the workpiece washer 91 to the workpiece retainer 21, may have shapes in compliance with the surface shapes of the workpieces W being worked.

Figure 3:
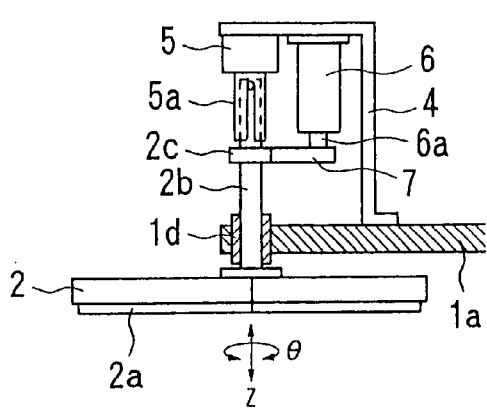
FIG. 3A represents a unit for vertically moving and rotating a suction head in the inventive dicing apparatus.
FIG. 3B offers a modification of the unit shown in FIG. 3A.
Figure 3:
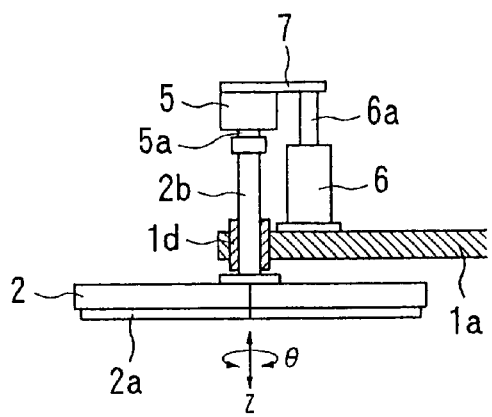

As shown in FIG. 3A, each of the suction heads 2 has a vertical shaft 2b on a center of an upper surface thereof, which is vertically movably mounted within a bush 1d formed at the lead portion of the arm 1a. Above the lead portion of the arm 1a, the motor 5 is mounted on a lower surface of a bracket 4. A top portion of the vertical shaft 2b is inserted into a hollow motor shaft 5a. The cylinder 6 is also mounted on the lower surface of the bracket 4, whose rod 6a is connected to a bearing 2c mounted around the vertical shaft 2b via a member 7. Since the vertical shaft 2b of the suction head 2 can only vertically move with respect to the hollow motor shaft 5a, the suction head 2 can be rotated by the motor 5, being vertically moved by the cylinder 6.

It should be understood that other unit different from the unit shown in FIG. 3A may be employed to rotate and vertically move the suction head 2. One example is shown in FIG. 3B, in which the vertical shaft 2b of the suction head 2 is connected to a shaft 5a of the motor 5 connected to the rod 6a of the cylinder 6 vertically mounted on the arm 1a via the member 7.

Figure 4:
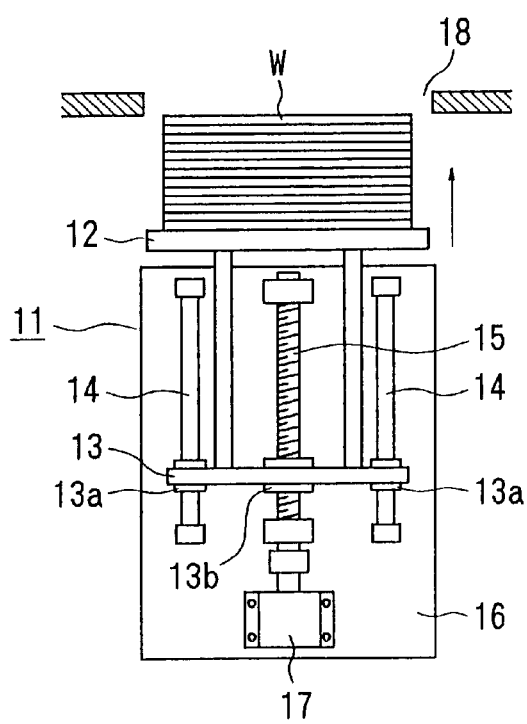
FIG. 4A presents an enlarged view of a workpiece supplier in the inventive dicing apparatus.
FIG. 4B illustrates an enlarged view of a workpiece retainer in the inventive dicing apparatus.
Figure 4:
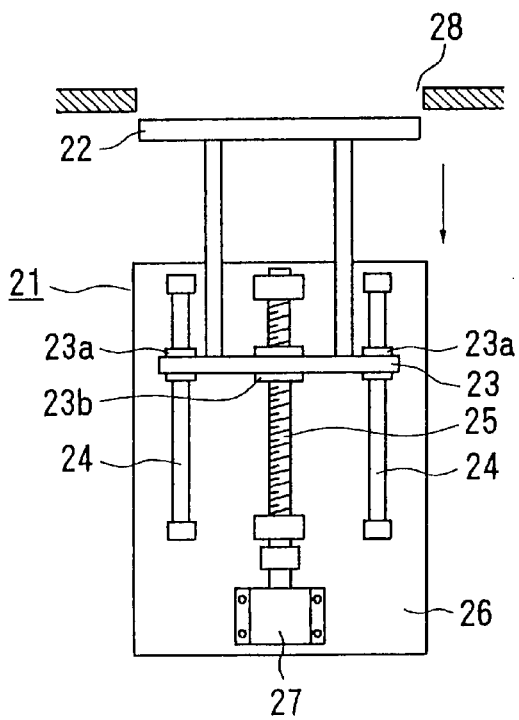

As shown in FIG. 4A, the workpiece supplier 11 is arranged at the first position P1. The workpiece supplier 11 is provided with a lifting plate 12 on which a plurality of workpieces W before dicing are stacked, a guide plate 13 connected to the lifting plate 12, a support plate 16 supporting a pair of guide rods 14 and a ball screw 15, and a motor 17 whose shaft 17a is connected to one end of the ball screw 15. A pair of bushes 13a through which a pair of guide rods 14 are mounted and a nut 13b engaged with the ball screw 15 are installed on the guide plate 13. The workpiece supplier 11 is able to maintain a height of the top workpiece W constant as a result of the motor 17 rotating the ball screw 15 leading to an intermittent raising of the lifting plate 12, thereby allowing the top workpiece W to be taken out through of a drawing-out port 18. Although not shown, a plurality of guiding posts are arranged around the lifting plate 12 to prevent the stacked workpieces W from crumbling or deviating from the desired position.

As shown in FIG. 4B, the workpiece retainer 21 is mounted on the fourth position P4. The workpiece retainer 21, similar to the workpiece supplier 11, is provided with a lifting plate 22 on which the workpieces W after being washed are stacked, a guide plate 23 connected to the lifting plate 22, a support plate 26 supporting a pair of guide rods 24 and a ball screw 25, and a motor 27 connected to one end of the ball screw 25 at its shaft 27a. A pair of bushes 23a through which a pair of guide rods 24 are mounted, respectively, and a nut 23b engaged with the ball screw 25 are installed on the guide plate 23. The workpiece retainer 21 receives the washed workpiece W being deposited through a receiving port 28 on the lifting plate 22, allowing the subsequent workpiece W to be stacked on top of the previous workpiece W. The workpiece retainer 21 is able to maintain a height of the top workpiece W constant as a result of the motor rotating the ball screw 25 leading to an intermittent lowering of the lifting plate 22. Although not shown, a plurality of guiding posts are arranged around the lifting plate 22 to prevent the stacked workpieces W from crumbling or deviating from the desired position.

Figure 5:
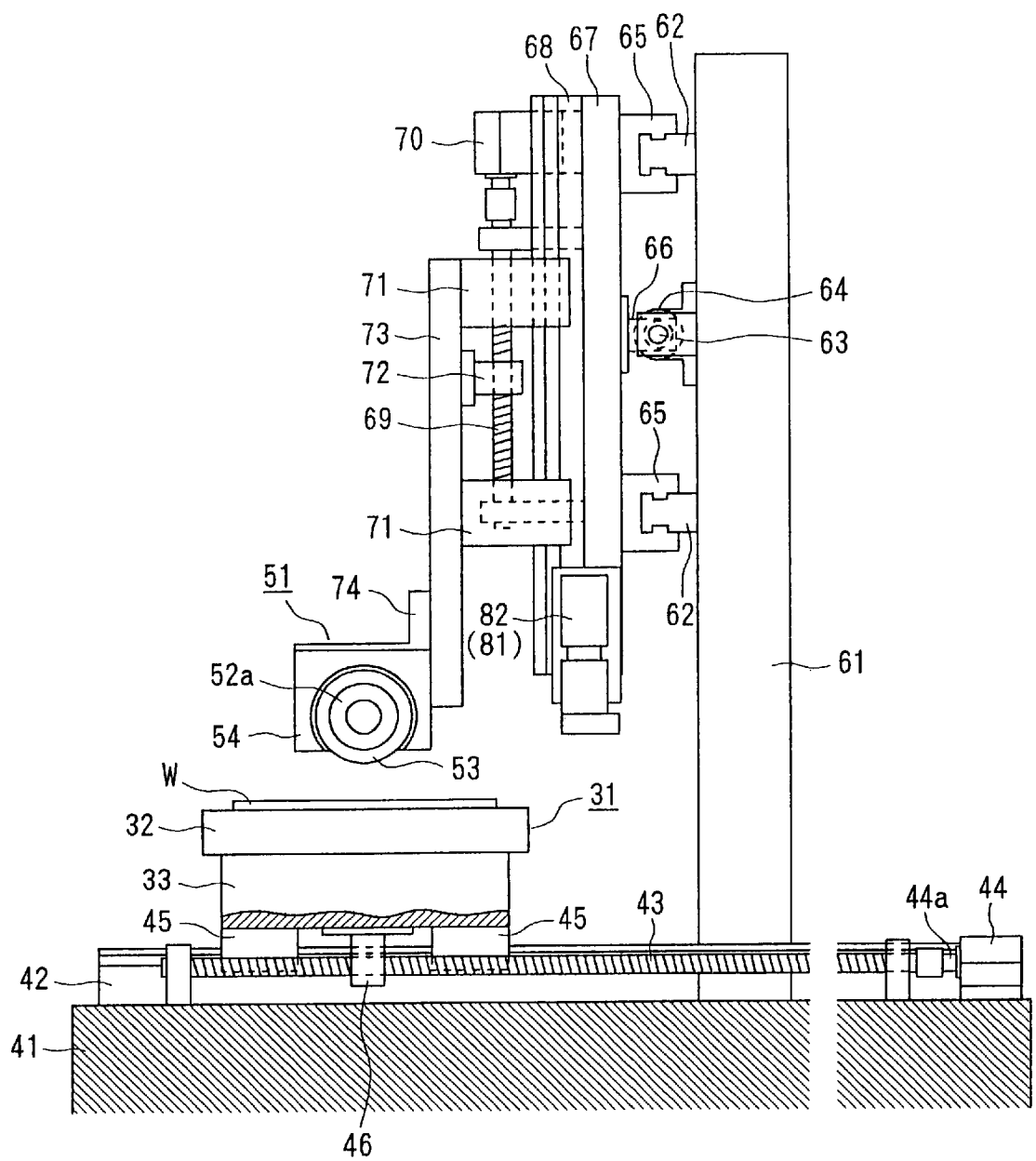
FIG. 5 offers a unit for moving a table in a X-direction and a unit for moving a dicing head in Y and Z directions in the inventive dicing apparatus.
Figure 6:
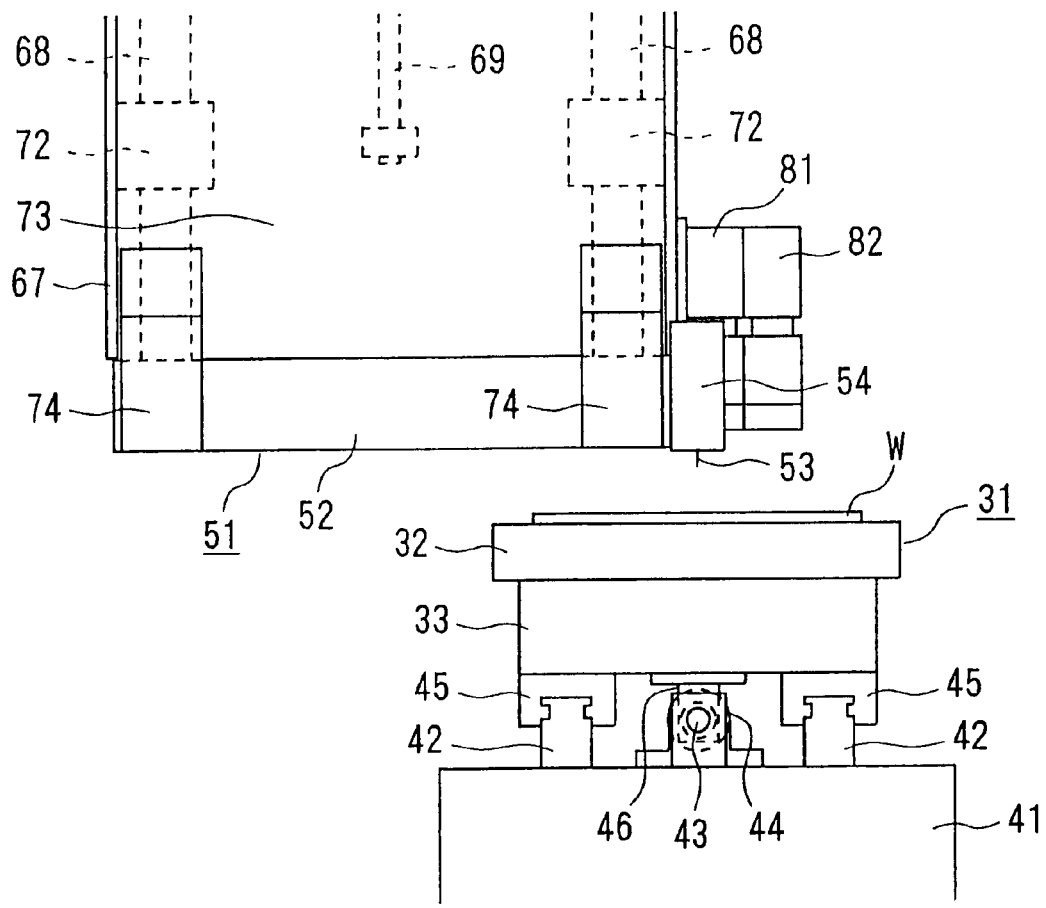
FIG. 6 shows a partial side elevational view of FIG. 5.

The table 31 is located at the second position P2. As shown in FIGS. 5 and 6, the table 31 is provided with a workpiece support plate 32 of a rectangular shape which is rotatable in a e direction(see FIG. 1), a slide die 33 rotatably supporting the workpiece support plate 32, a motor(not shown) rotating the workpiece support plate 32 in the é direction.

Although not shown, a plurality of suction holes are formed on the workpiece support plate 32, which communicate with a pneumatic circuit having a vacuum pump and valves. Consequently, the workpiece W is maintained on the workpiece support plate 32 by applying a negative air pressure to the suction hole and released from the workpiece support plate 32 by releasing the negative air pressure.

The table 31 is movable between the second position P2 and a dicing station spaced apart from the second position P2 along the X-direction(see FIG. 1). As shown in FIGS. 5 and 6, a transfer mechanism for transferring the table 31 in the X-direction is provided with a die plate 41, a plurality of guide rails 42 mounted on the die plate 41 along the X-direction, a ball screw 43 rotatably mounted on the die plate 41, being aligned in the X-direction, a motor 44 whose shaft 44a is connected to one end of the ball screw 43, a pair of slide guiders 45 engaged with the pair of guide rails 42, respectively, being fixed on a lower surface of the table 31, and a nut 46 fixed on the lower surface of the table 31, being in a thread-engagement with the ball screw 43. That is, the table 31 is moved in the X-direction along the guide rails 42 by driving the motor 44 and rotating the ball screw 45.

A dicing head 51 is arranged on the dicing station. As shown in FIGS. 5 and 6, the dicing head 51 is provided with a spindle motor 52 of a cylindrical shape, a blade 53 such as a diamond blade detachably fixed around a shaft 52a of the spindle motor 52, a blade cover 54 covering the blade 53 with a lower portion of the blade 53 being exposed, and a coolant nozzle(not shown) for supplying a coolant such as water to the blade 53 from an inner surface of the blade cover 54. A direction of the shaft 52a of the spindle motor 52 is parallel to an upper surface of the workpiece support plate 32 of the table 31, being at a right angle with a transferring direction of the table 31. A direction of the blade 53 is parallel to the transferring direction of the table 31.

The dicing head 51 is movable in the X, Y, and Z-directions (see FIG. 1). As shown in FIGS. 5 and 6, a transfer mechanism for transferring the dicing head 51 in the Y and Z-directions is provided with a strut 61, a pair of first guide rails 62 fixed on a lateral portion of the strut 62, being aligned with the Y-direction, a first ball screw 63 rotatably supported on the lateral portion of the strut 62, a first motor 64 whose shaft is connected to one end of the first ball screw 63, a pair of first slide guiders 65 movably engaged with the pair of first guide rails 62, respectively, a first nut 66 being in a thread-engagement with the first ball screw 63, a first slide plate 67 fixed with the first slide guiders 65 and the first nut 66, a pair of second guide rails 68 fixed on a lateral surface of the first slide plate 67, being aligned with the Z-direction, a second ball screw 69 rotatably supported on the lateral surface of the first slide plate 67, a second motor 70 whose shaft is connected to one end of the second ball screw 69, a pair of second slide guiders 71 movably engaged with the pair of second guide rails 68, respectively, a second nut 72 being in a thread-engagement with the second ball screw 69, a second slide plate 73 fixed with the second slide guiders 71 and the second nut 72, and two connecting members 74 for connecting a lower portion of the second slide plate 73 to a lead portion and a rear portion of the spindle motor 52, respectively. That is, the dicing head 51 is moved in the Y-direction, when the first slide plate 67 is moved along the first guide rails 62 by driving the first motor 64 and rotating the first ball screw 63, and is moved in the Z-direction, when the second slide plate 73 is moved along the second guide rails 68 by driving the second motor 70 and rotating the second ball screw 69.

Further, two cameras 81 and 82 having two-dimension image pickup device such as CCD therewithin are aligned in the Y-direction at a portion of the first slide plate 67 toward the table 31, being parallel to each other. The two cameras 81 and 82 serve to detect a position of the workpiece W on the table 31 by making a shot on the workpiece W. As a preferred embodiment, the camera 81 closer to the first slide plate 67 has a higher magnification than the other.

Figure 7:
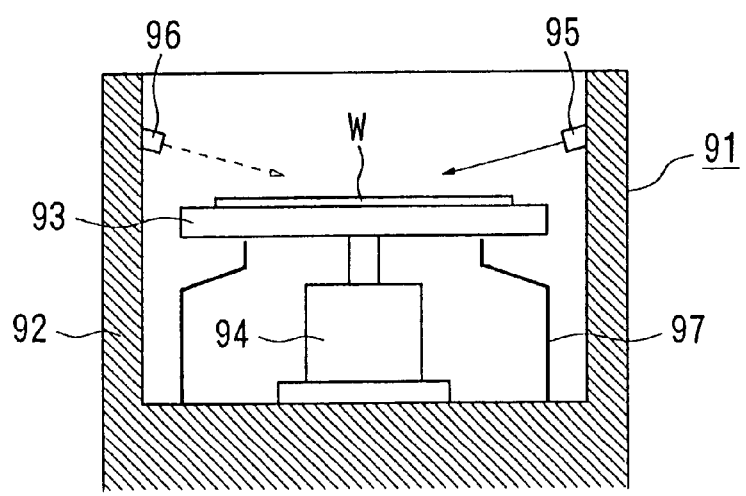
FIG. 7 is an enlarged view of a workpiece washer.

The workpiece washer 91 is arranged in the third position P3. As shown in FIG. 7, the workpiece washer 91 is provided with a fixed cylinder 92 having an upper opening, a turn table 93 arranged within the fixed cylinder 92, a motor 94 rotating the turn table 93, a washing water nozzle 95 for supplying washing liquid, such as water, toward the turn table 93, a gas nozzle 96 for supplying gases for drying such as air toward the turn table 93, and a waterproof cover 97 for preventing the washing liquid from entering the motor 94. Although not shown, a plurality of suction holes are formed on the turn table 93, which communicate with a pneumatic circuit having a vacuum pump and valves. Consequently, the workpiece W is maintained on the turn table 93 in a close contact therewith by applying a negative air pressure to the suction hole; and released from the close contact by releasing the negative air pressure.

Hereinafter, the operation of the dicing apparatus will be described.

Before the operation is started, the rotating arm 1 is positioned as shown in FIG. 1, three suction heads 2 thereof being located above the first position P1 to the third position P3, respectively.

When the operation begins, first, the suction head 2 positioned to right and bottom of the rotating arm 1 in FIG. 1 is shifted down in such a way that a first workpiece W in the workpiece supplier 11 is sucked-up and retained by the suction head 2 and then, the suction head 2 holding the first sucked workpiece is lifted up to be returned to the original position.

Figure 8:
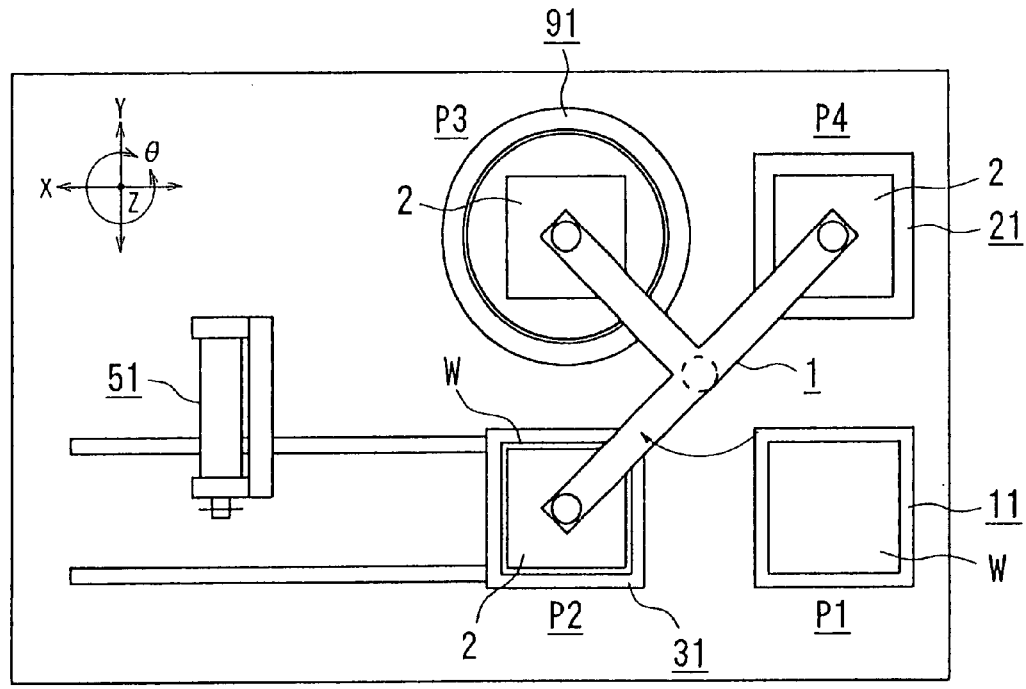
FIGS. 8 to 15 show views illustrating how the dicing apparatus shown in FIG. 1 operates.

Next, as shown in FIG. 8, the rotating arm 1 is rotated clockwise at an angle of 90 degrees and the suction head 2 holding the first sucked workpiece is lowered down in such a way that the first sucked workpiece is loaded onto the table 31. After the loading is completed, the suction head 2 from which the first workpiece is released is raised up to return to the original position. The workpiece W loaded onto the table 31 is sucked-up and retained by the workpiece support plate 32.

Figure 9:
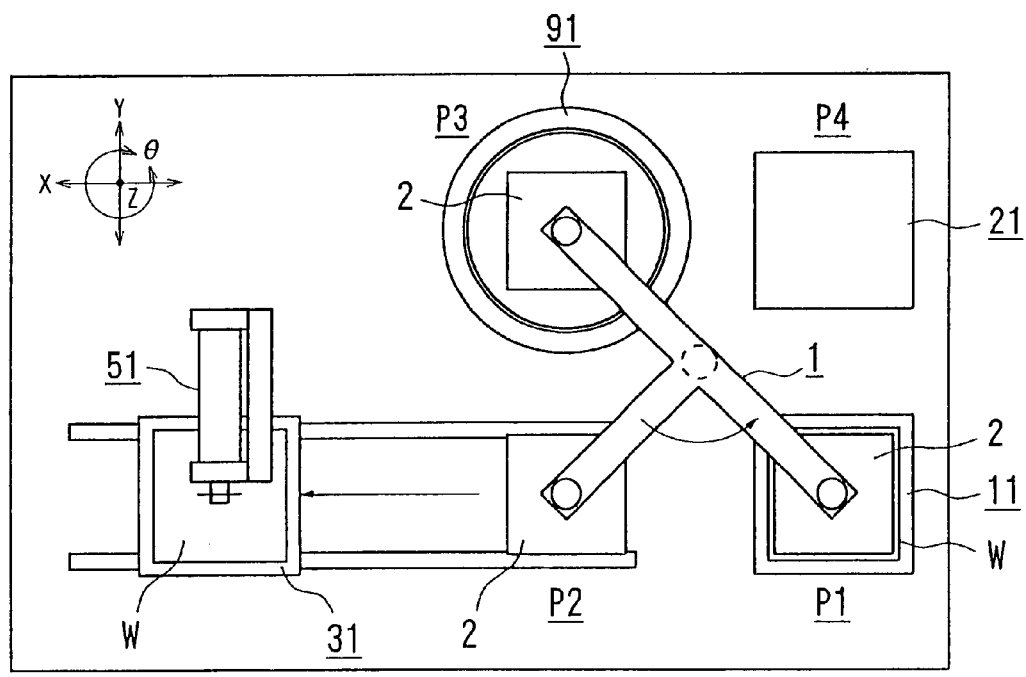

Further, as shown in FIG. 9, the rotating arm 1 is rotated counterclockwise at an angle of 90 degrees and, at the same time, the table 31 loading the workpieces W is moved from the second position P2 to the dicing area.

When the table 31 is moved to the dicing area, the workpiece W on the table 31 is first imaged by the camera 82 (FIG. 6) of a low magnification to thereby perform a rough position detecting of the workpiece W based on the obtained image data. Further, the workpiece W is further imaged by the camera 81 (see FIG. 6) of a high magnification to thereby perform an exact position detecting of the workpiece W based on the obtained image data. When the detections are completed, the dicing operation on the workpiece W on the table 31 is performed based on the detected information.

To be more specific, by properly shifting the table 31 capable of moving in the direction of X and the dicing head 51 capable of moving in the direction of Y and Z, an initial position of the plate 53 to the workpiece W can be determined. Next, the plate 53 of the dicing head 51 rotates and the table 31 shifts in the direction of X at a regular speed in such a way that a first cut to the workpiece W is made. After the first cut, the dicing head 51 is raised up in the direction of Z for a predetermined distance to thereby allow the blade 53 to be separated from the workpiece W and, then, the table 31 is shifted in an opposite direction as described above and the dicing head 51 is shifted to a bottom side in the direction of Y for a predetermined distance to thereby perform a line change. Then, after the dicing apparatus 51 is lowered down in the direction of Z to make a height thereof to be consistent with that of the line change, the table 31 is shifted in the direction of X at a regular speed as described above in such a way that a second cut to the workpiece W is made. Hereafter, the same operation as described above is repeatedly performed to thereby obtain a desired number of cuts in the same direction. Next, the table 31 is raised by an angle of 90 degrees to thereby alter the direction of the workpiece W in such a way that a desired number of cuts can be made in the direction perpendicular to the cuts previously made. It should be noted that the cuts can alternately be made in perpendicular direction to each other. As a result, the workpiece W on the table 31 is cut in a grid-like manner, dividing into separate chips. Since a resin sheet is affixed through an adhesive layer to a lower surface of the workpiece W, the divided chips can retain the affixed state to the resin sheet. Further, during the dicing, a coolant supplied through the coolant injecting nozzle disposed to the blade cover 54 toward the blade 53 removes machining remnants from the dicing operation, such as fine ceramic powders.

Figure 10:
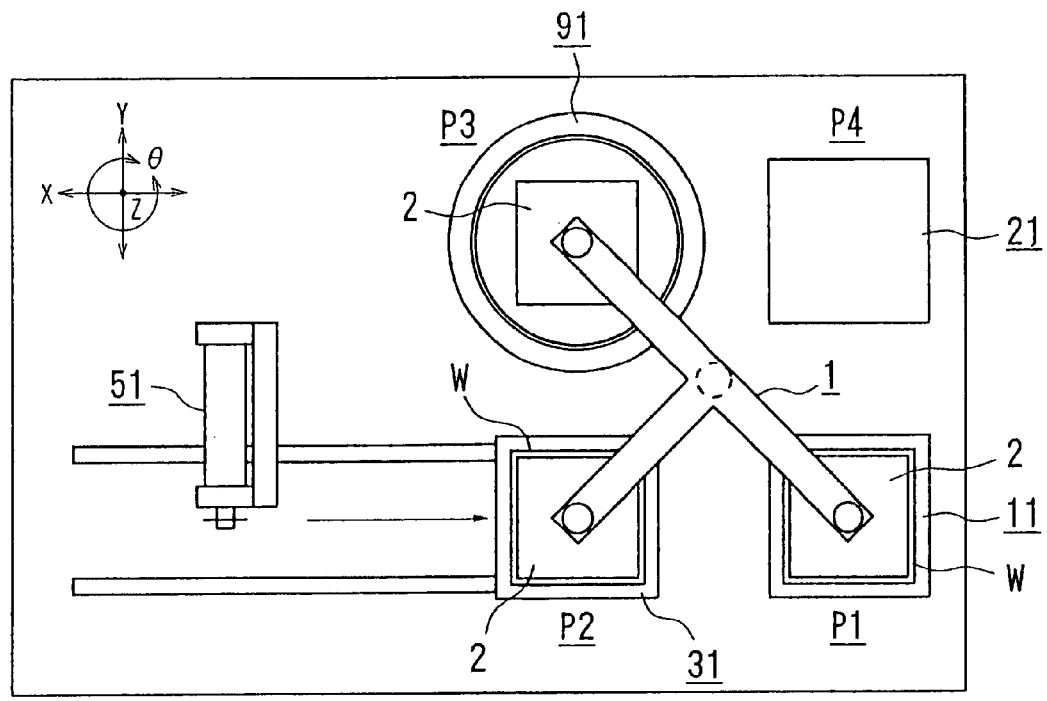

After the dicing, as shown in FIG. 10, the table 31 is returned to the second position P2. The suction head 2 positioned to left and bottom of the rotating arm 1 in figure is lowered down, sucks up and retains the diced workpiece W on the table 31 and is then raised up to return to the original position while retaining the diced workpiece W. Further, the suction head 2 positioned to right and bottom of the rotating arm 1 in figure is lowered down, sucks up and retains the second workpiece W in the workpiece supplier 11, and then is raised up to return to the original position while retaining the second workpiece W.

Figure 11:
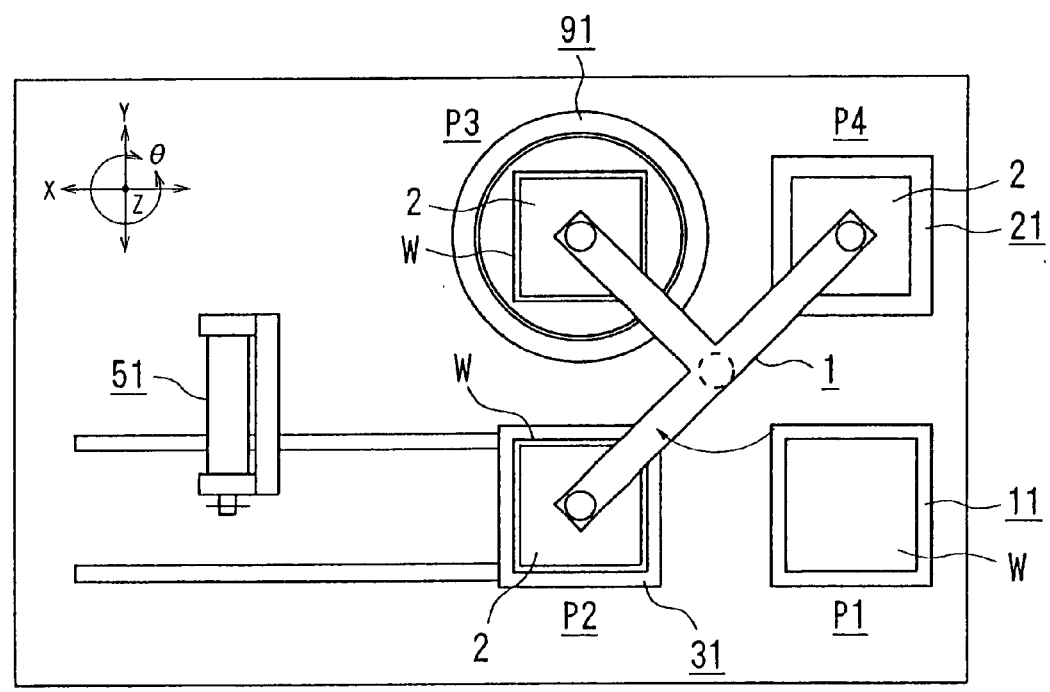

As shown in FIG. 11, as a result of the rotating arm 1 rotating clockwise at an angle of 90 degrees and the suction head 2 retaining the diced workpiece W being lowered down, the diced workpiece W gets loaded onto the turn table 93 of a workpiece washer 91. The suction head 2 releases the retained diced workpiece W and is raised up, returning to the original position. The workpiece W remains on the turn table 93 by a suction force being applied thereto. Further, the suction head 2 retaining the second workpiece W is lowered down, releases the second workpiece W to be loaded to the table 31 and then is raised up to return to the original position. The second workpiece W remains on the workpiece supporting plate 32 by a suction force being applied thereto.

Figure 12:
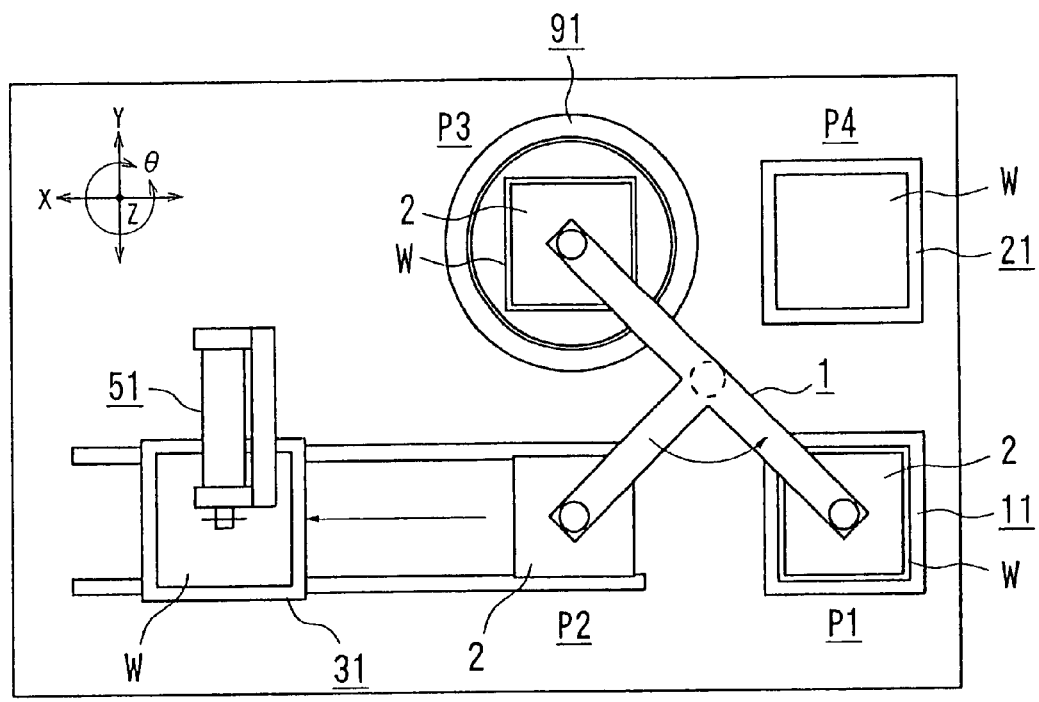

As shown in FIG. 12, when the rotating arm 1 is rotated counterclockwise at an angle of 90 degrees, the table 31 loaded with the second workpiece W is also shifted from the second position P2 to the dicing area. After the table 31 is shifted to dicing area, the position detection and the dicing are performed as described above and the diced workpiece W on the turn table 93 is washed by the workpiece washer 91 simultaneously.

To be more specific, the washing of the diced workpiece W consists of a washing process and a drying process, the two processes forming one cycle, wherein the washing process includes a rotating of the turntable provided with the diced workpiece W thereon top at a certain speed and supplying a washing liquid from the washing water nozzle 95 theretoward, and the drying process includes rotating of the turntable 93 provided with the diced workpiece W thereontop at a certain speed and supplying a drying gas from the gas nozzle 96 theretoward. In addition, the washing liquid after washing is drained through a drain port(not shown) to outside, the drain port being disposed to the fixed tube 92 or the waterproofing cover 97.

Figure 13:
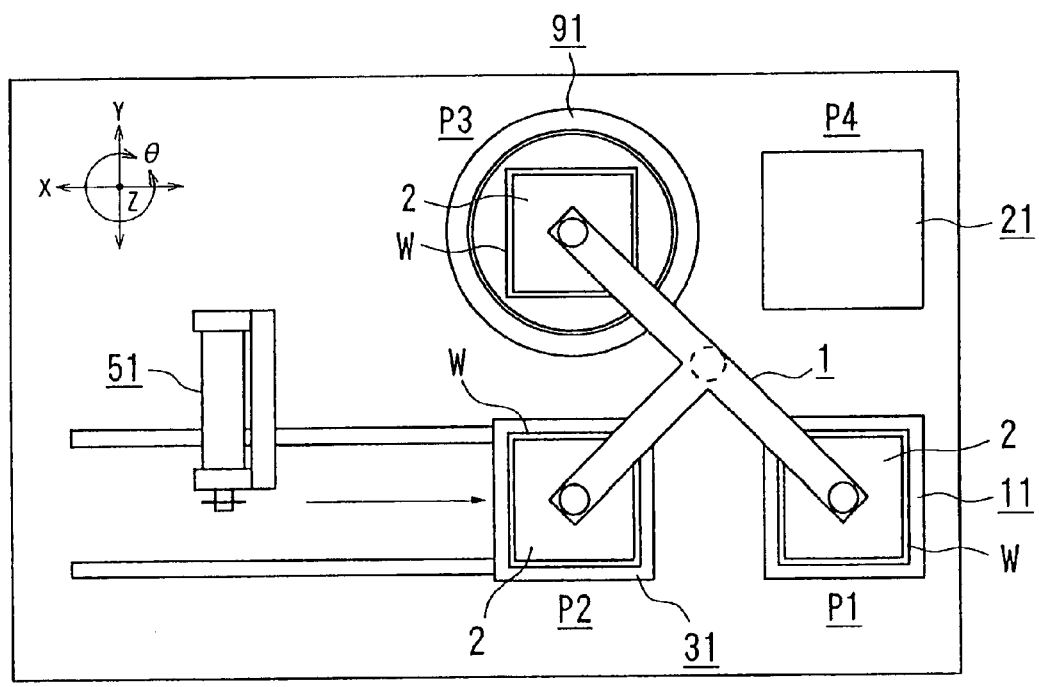

When the dicing and the washing are completed, as shown in FIG. 13, the table 31 is returned to the second position P2. Further, the suction head 2 positioned to left and top of the rotating arm 1 in figure is lowered down, sucks up and retains the washed workpiece W on the turn table 93 of the workpiece washer 91 and then is raised up to return to the original position while retaining the washed workpiece W. In addition, when the suction head 2 positioned to right and bottom of the rotating arm 1 in figure is lowered down, sucks up and retains, and is then lifted up to return to the original position, while retaining the diced workpiece W on the table 31. Further, when the suction head 2 positioned to right and bottom of the rotating arm 1 in figure is lowered down, sucks and retains the third workpiece W in the workpiece supplier 11, and is then lifted up to return to the original position, while retaining the third workpiece W.

As shown in FIG. 14, the rotating arm 1 is rotated clockwise at an angle of 90 degrees and the suction head 2 retaining the washed workpiece W is lowered down to load the washed workpiece W onto the lifting plate 22 of the workpiece retainer 21, by the suction head. 2 releasing the washed workpiece W. The suction head 2 is then raised up to return to the original position. Further, the suction head 2 retaining the third workpiece W is lowered down, releases the third workpiece W onto the table 31. The suction head 2 is then raised up to return to the original position, allowing the third workpiece W to be retained by the workpiece supporting plate 32.

Next, a sequence as described in FIGS. 12 to 14 is repeated performing the dicing, the washing and the storing of the workpieces W.

According to the dicing apparatus as describe above, since the first position PE for supplying the workpiece W before dicing, the second position P2 for loading the workpiece W on the table 31, the third position P3 for washing the diced workpiece W, and the fourth position P4 for storing the washed workpiece W are disposed clockwise at regular intervals of an angle of 90 degrees on a same circumference and three suction heads 2 of the rotating arm 1 having a pivoting shaft 1a at center of the circumference are disposed at an angle of 90 degrees along the circumference, a workpiece transportation from the first position P1 to the second position P2, a workpiece transportation from the second position P2 to the third position P3, and a workpiece transportation from third position P3 to the fourth position P4 can be precisely carried out.

That is, since the rotating arm 1 is rotated to reciprocate between the position in which three suction heads 2 correspond to the first to the third positions P1 to P3, respectively, and the position in which three heads 2 correspond to the second to the fourth positions P2 to P4, respectively, there is no necessity for the rotating arm 1 to rotate at larger angles than an angle of 90 degrees, allowing the workpieces to be efficiently stably transported.

Further, according to the above dicing apparatus, since no workpiece is transported from the fourth position P4 to the first position P1, if three suction heads 2 are disposed to the rotating arm 1 at regular intervals of an angle of 90 degrees along the circumstance, an excellent workpiece transportation can be achieved for even in a situation where the greatest number of workpieces are transported, for example, when the workpieces W are transported simultaneously from P1 to P2, from P2 to P3 and from P3 to P4. In other words, since there is no need for disposing an unnecessary suction head 2 to the rotating arm 1, the rotating arm 1 having a T-shaped configuration can be employed, simplifying the structure of the dicing apparatus, which, in turn, results in reducing the manufacturing and maintenance costs.

In the dicing apparatus as described above, since the rotating arm 1 is provided with an actuator for raising up and rotating the three suction heads 2 individually, a desired transportation can be smoothly performed by appropriately raising up the suction head 2 even in presence of a stepped portion or an obstacle between the first position P1 and the second position P2, between the second position P2 and the third position P3, and between the third position P3 and the fourth position P4. Further, even in a situation where the direction of the transported workpiece W is needed to be changed, including during the transportation, this can be accomplished simply by properly rotating the suction head 2.

Figure 15:
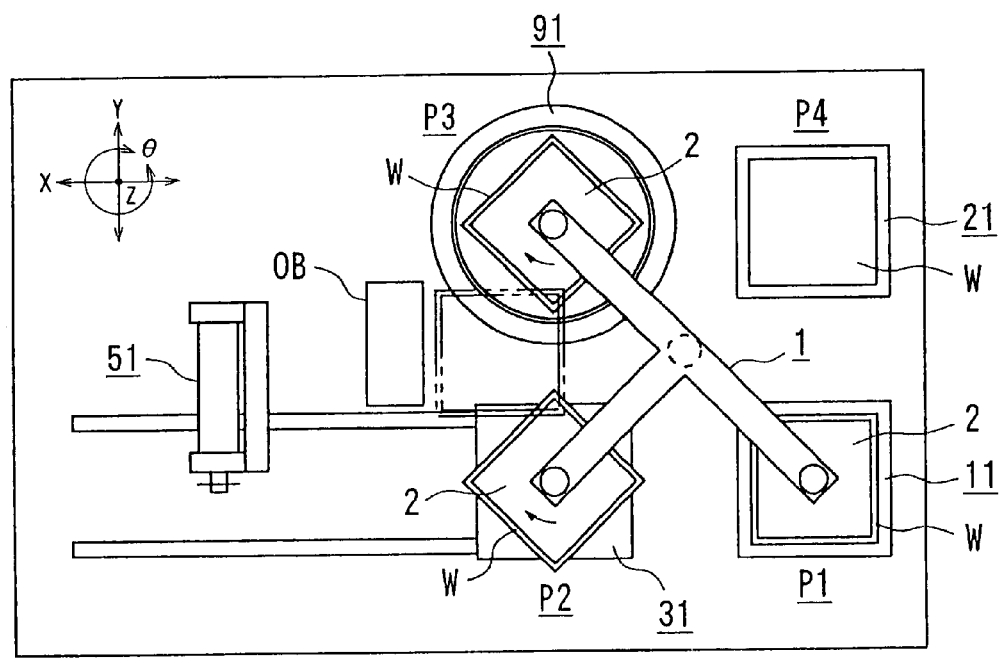

In relation to this, as shown in FIG. 15, if an obstacle is present, which may collide with the suction head 2 and the workpiece being transported, for example, the obstacle being a portion of the actuator for shifting the dicing head 51 in the direction of Y and Z positioned between the second position P2 and the third position P3, it is preferable that, after sucking up and retaining the diced workpiece W on the table 31, the suction head 2 may be rotated clockwise or counterclockwise at angle of 45 degrees and the rotating arm 1 may be rotated clockwise at angle of 90 degrees. This results in preventing the workpiece W and the suction head 2 from colliding with the obstacle during their transport from the second position P2 to the third position P3. However, when the suction head 2 retaining the diced workpiece W is rotated clockwise or counterclockwise from the second position P2 at an angle of 45 degrees, the suction head 2 retaining the workpiece W at the third position P3 is also rotated by an angle of 45 degrees. Accordingly, in order to counter this, the suction head 2 must be rotated clockwise or counterclockwise at an angle of 45 degrees before the diced workpiece W is loaded on the turn table 93 of the workpiece washer 91, or the turn table 93 must be rotated at an angle of 45 degrees after the washing.

Even though the above dicing apparatus was described using a ceramic multilayer as an example of the workpiece W. workpieces other than the ceramic multilayer, for example, a semiconductor wafer or an integrated circuited wafer, can be divided into individual chips using the above described apparatus, yielding the same results.

Furthermore, although the rotating arm 1 having a T-shaped configuration is shown in the above described dicing apparatus, a rotating arm having a different configuration can be used, provided that three suction heads 2 thereon are spaced apart on a same circumstance at an angle of 90 degrees.

In addition, although the suction head 2 is disposed to a tip portion of each of the arm 1a of the rotating arm 1 having a T-shaped configuration in the above described dicing apparatus, each of the arm portions 1a can be extendably constructed in at least two steps or can be constructed to be bent in a hinge portion, allowing the suction head 2 to slide by properly extending or bending the arm portion 1a. This again simplify the maintenance in each of the positions P1 to P4.

Figure 16:
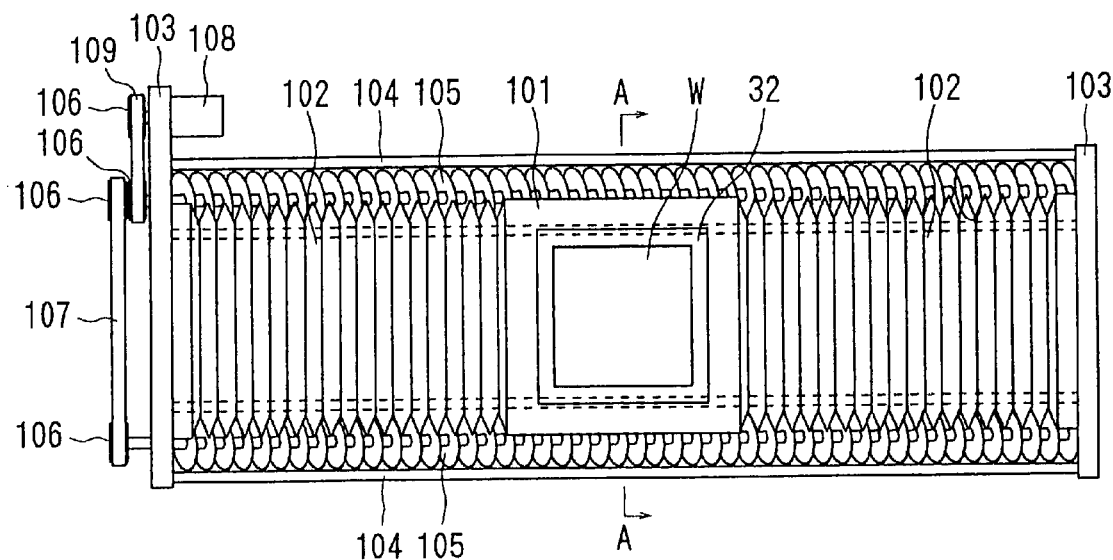
FIG. 16 presents a configuration for preventing coolant from entering a table moving mechanism.
Figure 17:
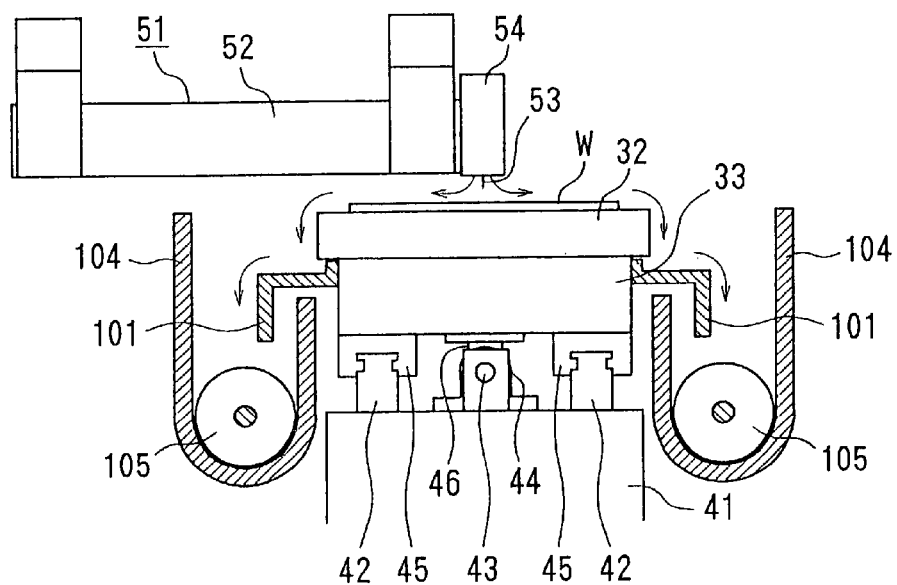
FIG. 17 represents a sectional view when taken along a line A—A shown in FIG. 16.

Referring to FIGS. 16 and 17, there is shown a useful structure for preventing a coolant being supplied to the blade 53 during the dicing from entering into the mechanism for shifting the table 31 in the direction of X.

Reference numeral 101 designates a waterproofing cover having an open rectangle-shaped configuration in its cross-section and tightly attached around a sliding table 33 of the table 31, and reference numeral 102 designates a pair of extendible cover having an open rectangle-shaped configuration in its cross-section and for connecting an end thereof to both ends of the X-direction of the waterproofing cover 101. The extendible cover 102 is made of a synthetic resin such as neoprene, silicone, and the like and a resin coated core fabric and formed into a bellows, thereby allowing it to appropriately expand and contract when the table 31 moves in the direction of X. Also, reference numeral 103 designates a pair of supporting plates to which other end of a pair of extendible covers 102 is air-tightly connected, and reference numeral 104 designates a drain member having a U-shaped configuration, both ends thereof being air-tightly connected to the supporting plate. The pair of supporting plates 103 are attached to a die plate 41, while the pair of drain members 103 are disposed to parallel to both sides of the table 31, respectively, to thereby allow a vertical portion of the waterproofing cover 101 having an open rectangle-shaped configuration in the cross section to be inserted into an inside thereof.

Reference numeral 105 designates a spiral brush disposed to an inside of the pair of drain members 104, respectively. A center shaft of each of the brush 105 is rotatably supported to the pair of supporting plates 103 to thereby allow a lower portion thereof to flank to an inner bottom of the drain member 104. One end of the shaft of two spiral brush 105 is provided with a pulley 106, respectively, while a belt 107 is wound on the two pulleys 106. Further, one end of a shaft of one spiral brush 105 is provided with a separate pulley 106, respectively, while the belt 107 is wound between the separate pulley 10 and a pulley mounted on the motor 108. That is, two spiral brushes 105 are rotated in the same direction about a shaft thereof by way of the operation of the motor 108. In other words, a side of the pair of drain members 104 to which the pulley 106 is disposed are higher than other side thereof, or on the contrary, the side is inclined to thereby provide with an outlet(not shown) at a bottom of the lower side or end. Further, the orientation of two spiral brushes 105 are rotated to improve the drainability without impeding a natural drainability of the inclined drain members 104.

As previously described, when the dicing operation is performed on the workpiece W on the table 31, a coolant is supplied from a coolant injecting nozzle disposed on the blade cover 54 toward the blade 53 in such a way that a machining remnants produced by way of the cooling and the cutting of the blade 53 are removed. The coolant including the machining remnants flow to the drain member 104 from the waterproofing cover 101 and the extendible cover 102 as indicated by an arrow in FIG. 17. This coolant is drained from the outlet by flowing along the slope of the drain member 104. At the same time, two spiral brush 105 are rotated by the motor 108 to thereby allow the machining remnants remaining in an inner bottom of the drain member 104 to be moved toward the outlet.

That is, if the above described spiral brushes 105 are not present, the machining remnants contained in the coolant may remain at the inner bottom of the drain member 104, but as a result of the spiral brush 105 rotating, the machining remnants remaining at the inner bottom of the drain member 104 are moved toward the outlet to be drained out therefrom, thereby preventing the overflow of the coolant from the drain member 104.

Further, since the waterproofing cover 101 and the extendible cover 102 have an open rectangle-shaped configuration in a cross section and the vertical portion of the waterproofing cover 101 is inserted therein, the coolant from top of the table 31 to an inside of the waterproofing cover 101 can not enter the table shifting mechanism including a guide rail 42 and the ball screw 43.

Figure 18:
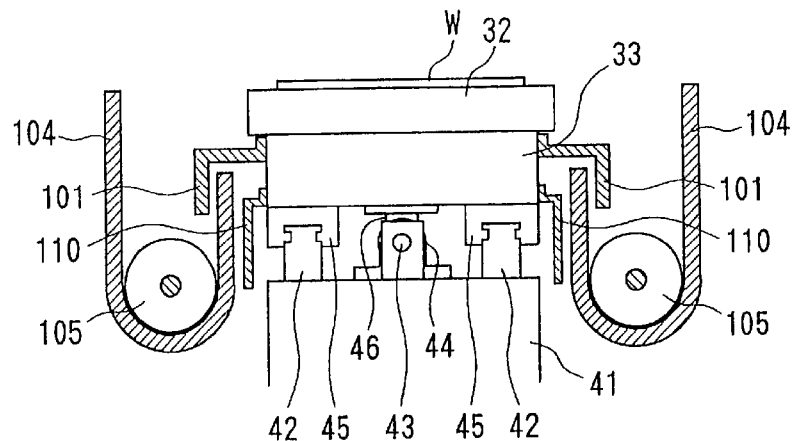
FIGS. 18 to 23 depict modifications of the configuration shown in FIG. 16.

To enhance the waterproofing, it is preferable that a second waterproofing cover 110 having the same shape as the waterproofing cover 101 as shown in FIG. 18 may be air-tightly attached around the sliding die 33 and one end of a pair of second extendible covers(not shown) having the same shape as the extendible cover 102 may be air-tightly connected to the X direction of the second waterproofing cover 110 and another end thereof may be air-tightly connected to the supporting plate 103, thereby further preventing the coolant from entering the table shifting mechanism.

Figure 19:
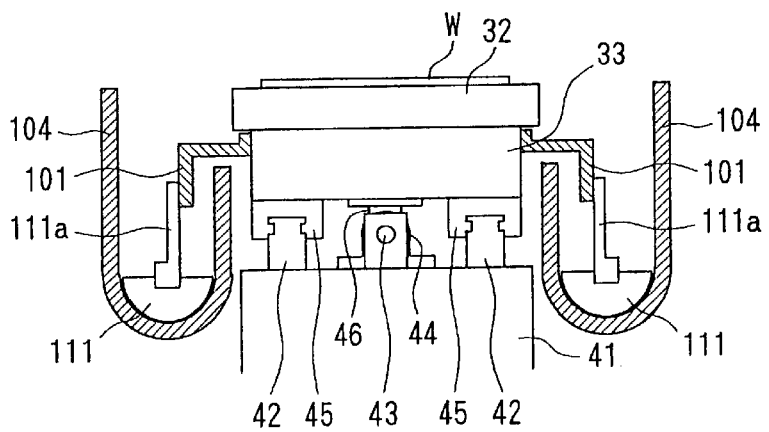
Figure 20:
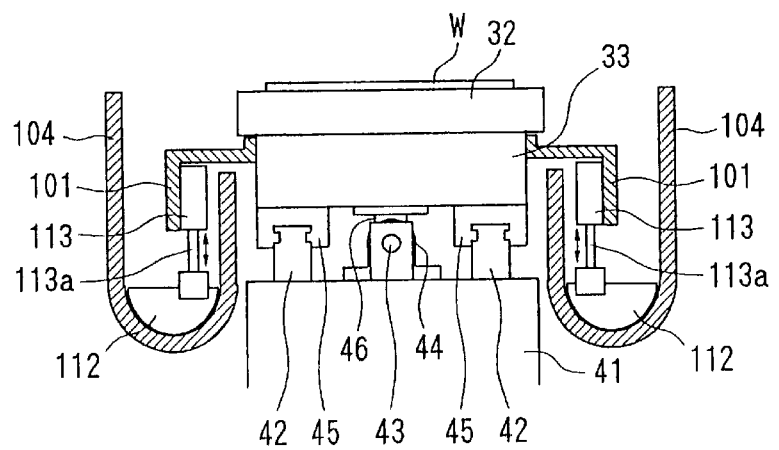
Figure 21:
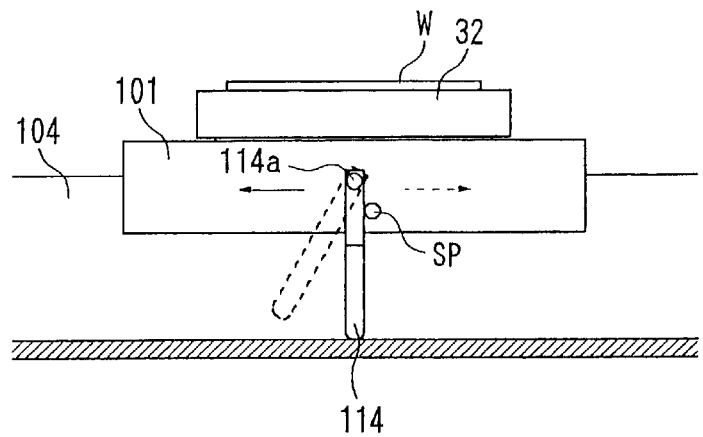

Further, the machining remnants remaining at the inner bottom of the drain member 104 can be moved toward the outlet without using the spiral brush 105. For example, as shown in FIG. 19, a flexible chip sampling plate 111 whose a lower portion is adhered to the inner bottom of the drain member 104 through a rod 111a to the waterproofing cover 101 allows the chip sampling plate 111 to move at the same time the table 31 is moved in the X direction, allowing the machining remnants remaining in the inner bottom of the drain member 104 to also move toward the outlet. In this case, since the movement of the machining remnants by the chip sampling plate 111 are not restricted to only one direction, it is preferable that a plurality of outlets may be disposed to the inner bottom of the drain member 104. Of course, as shown in FIG. 20, it is possible to restrict the movement of machining remnants in one direction only by disposing the chip sampling plate 112 identical to the plate 111 on a rod 113a of the cylinder 113, making it possible for it to be lifted up and lowered down and moving the chip sampling plate 112 in a lowered down condition. In addition to the above, as shown in FIG. 21, the same result can be obtained by rotatably disposing an upper end of the chip sampling plate 114 identical to the above described plate to the waterproofing cover 101 through a pin 114a and limiting the rotating direction thereof using a stopper pin SP.

Figure 22:
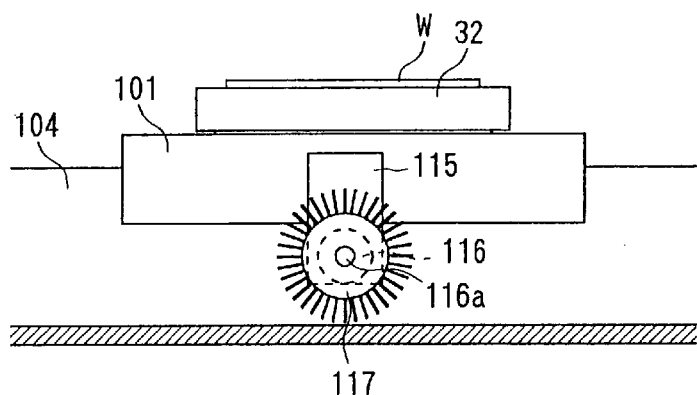

Further, as shown in FIG. 22, a motor 116 having a waterproofing function may be disposed to a supporting member 115 disposed to the waterproofing cover 101 and a cylindrical brush 117 may be disposed to a shaft 116a of the motor 116 to thereby allow the lower portion of the brush to be adhered to the inner bottom of the drain member 104. Under this situation, when the table 31 is moved toward the X direction, the brush 117 is rotated at a predetermined direction, thereby allowing the machining remnants remaining at the inner bottom of the drain member 104 to move toward the direction of the outlet.

Figure 23:
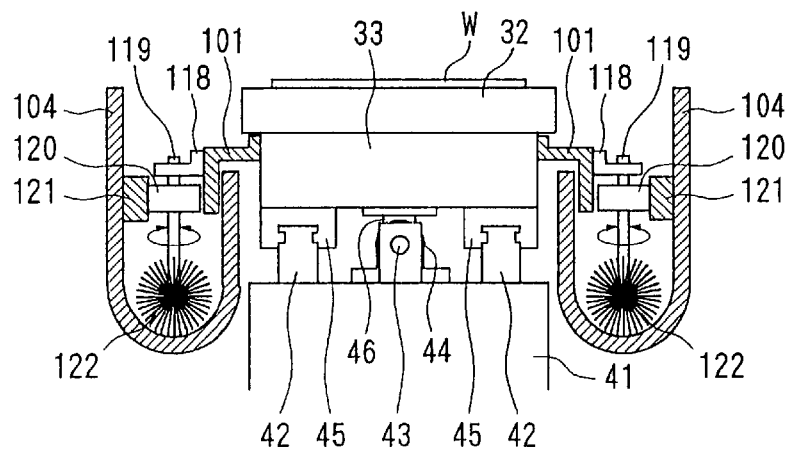

In FIG. 23, a rod 119 is rotatably disposed to a supporting member 118 disposed to the waterproofing cover 101 and a roller 120 is disposed to the rod 119 so that the roller 120 is in contact with an inner surface of the drain member 104 or a rail 121 disposed to the inner surface thereof. By disposing a spherical brush 122 to a lower end of the rod 119 to allow a lower portion thereof to be in contact with the inner bottom of the drain member 104, a brush 122 can be rotated by the roller 120 simultaneously rotating with moving of the table 31 toward the X direction. This results in the machining remnants remaining at the inner bottom of the drain member 104 to move toward the outlet direction. In this case, if a pinion is used as the roller 120 and a rack is used as the rail 121, the rotation of the brush 122 resulting from the movement of the table 31 can be made more precise.

Figure 24:
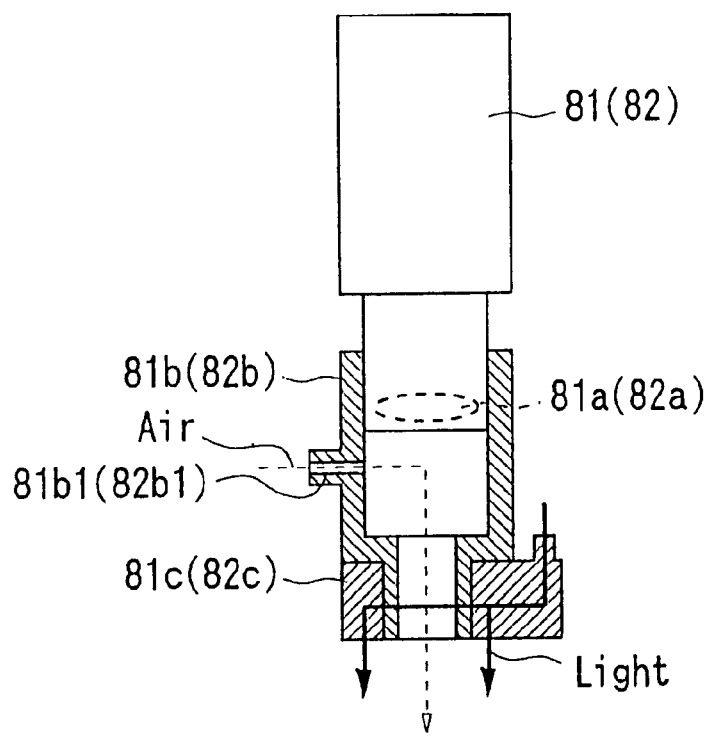
FIG. 24 shows a configuration for preventing the coolant from being attached to a camera.

In FIG. 24, there is shown a structure which is useful for preventing the imaging capability of cameras 81 and 82 from deteriorating as a result of the coolant supplied toward the blade 53 during dicing getting attached to an objective lens thereof.

In figure, reference numerals 81, 82 respectively designate camera, reference numerals 81a, 82a respectively designate an objective lens, reference numerals 81b, 82b respectively designate a tubular lens hood disposed to a lower portion of the cameras 81, 82, and reference numerals 81c, 82c respectively designate an illuminator disposed to a lower portion of the lens hood 81b, 82b. The illuminators 81c, 82c transport a light transmitted through an optical fiber or the like in a direction indicated by a dotted arrow and irradiates the light from a lower surface thereof in a ring shape, illuminating the workpiece W during imaging. A pair of intake ports 81b1, 82b1 are disposed to a peripheral surface of the tubular lens hoods 81b, 82b. An actuator circuit having an air compressor and a valve is connected to the intake ports 81b1, 82b1.

As previously described, when the workpiece W on the table 31 is diced, the coolant is supplied from the coolant injecting nozzle disposed to the blade cover 54 toward the blade 53, simultaneously cooling the blade 53 and removing the machining remnants. The coolant supplied toward the blade 53 is prevented from getting attached to the objective lens by an air being supplied through the intake ports 81b1, 82b2 into the lens hood 81b, 82b, the air exiting the lens hood through an opening provided at a lower surface thereof.

That is, the coolant supplied toward the blade 53 and scattered by the rotation of the blade 53, is prevented from entering the lens hoods 81b1, 82b1 and from getting attached to the lens 81a, 82a by the air being supplied as described above, thereby setting an optimum condition for imaging.

Figure 25:
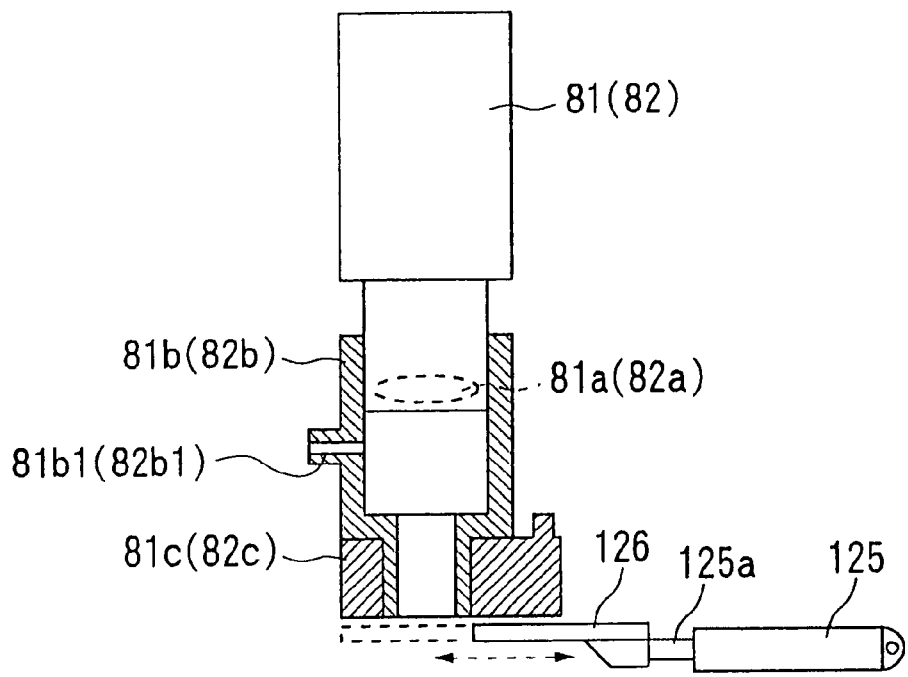
FIGS. 25 to 30 describe modifications of the configuration shown in FIG. 24.

There is shown in FIG. 25 a view setting forth a shutter assembly for selectively blocking up the bottom opening of the tubular lens hood 81b or 82b. The shutter assembly includes a cylinder 125, a rod 125a slidable provided at the cylinder 125 and a shutter 126 installed on the rod 125a. The cylinder 125 is fixedly installed at a support (not shown) for supporting the camera 81 or 82. After the workpiece W on the table 31 is diced, the cylinder 125 allows the rod 125a to move the shutter 126 toward a location immediately below the bottom opening of the lens hood 81b or 82b, resulting in the shutter 126 blocking up the bottom opening of the lens hood 81*b* or 82*b*, thereby preventing the coolant from entering the lens hood 81*b* or 82*b* through the bottom opening thereof.

Figure 26:
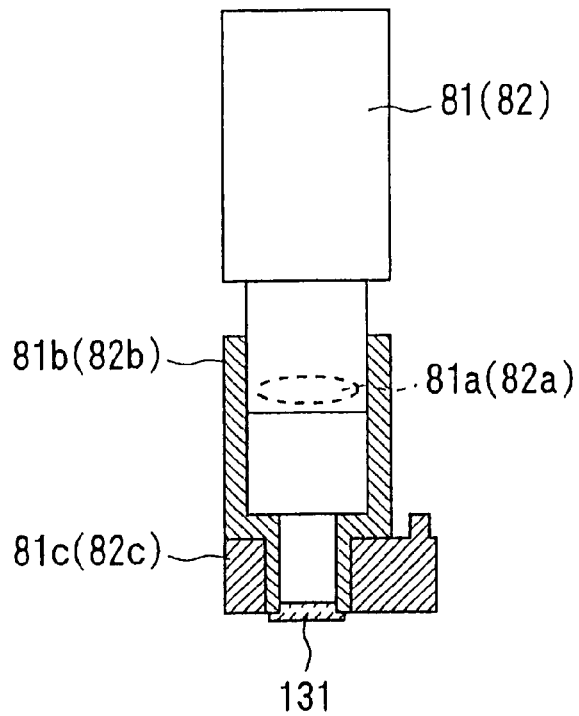

In order to prevent an image deterioration due to the coolant getting attached to the lens, various structures can be employed. As shown in FIG. 26, a transparent filter 131 having a hydrophilic property can be employed. To be more specific, the transparent filter 131 is installed at the bottom opening of the lens hood 81*b* or 82*b* so as to block up the bottom opening thereof, which, in turn, allows membranes of the coolant to be formed uniformly, thereby providing an improved image over the case in which the coolants are scattered and get attached to the lens.

Figure 27:
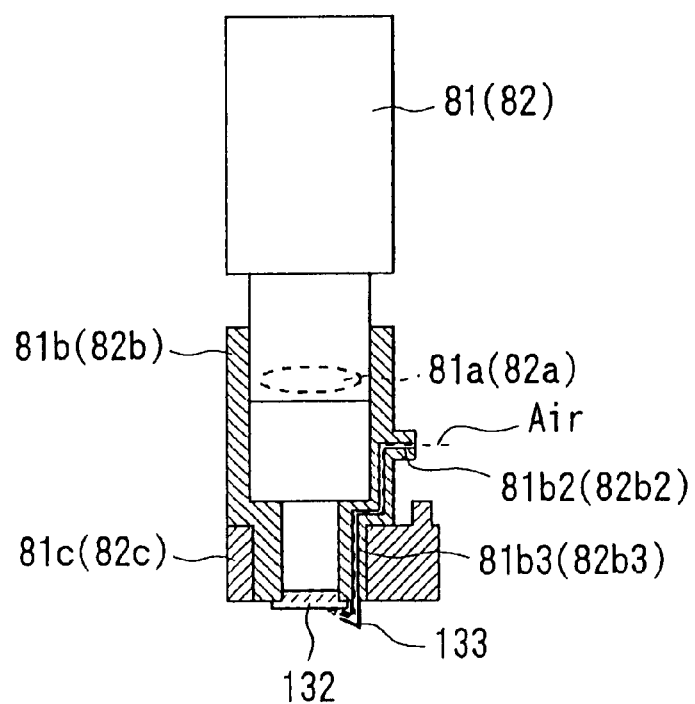

As shown in FIG. 27, a transparent filter 132 having a water repellent property and means for detaching the coolant attached on the transparent filter 132 can be employed. The transparent filter 132 is installed at the bottom opening of the lens hood 81*b* or 82*b* so as to block up the bottom opening thereof. The detaching means includes an intake port 81*b*2 or 82*b*2 provided at a substantially central periphery of the lens hood 81*b* or 82*b*, a vent passage 81*b*3 or 82*b*3 extending from the intake port 81*b*2 or 82*b*2 to bottom of the lens hood 81*b* or 82*b*, and a nozzle 132 provided at the vent passage 81*b*3 or 82*b*3 toward a bottom of the transparent filter 132. Under this arrangement, an air sprayed from the intake port 81*b*2 or 82*b*2 toward the bottom of the transparent filter 132 via the vent: passage 81*b*3 or 82*b*3 and the nozzle 132 detaches the coolants stuck on the transparent filter 132, resulting in preventing the image from deteriorating. As a result of the transparent filter 132 having water repellent property, it is easy to detach the coolant therefrom by spraying it with the air.

Figure 28:
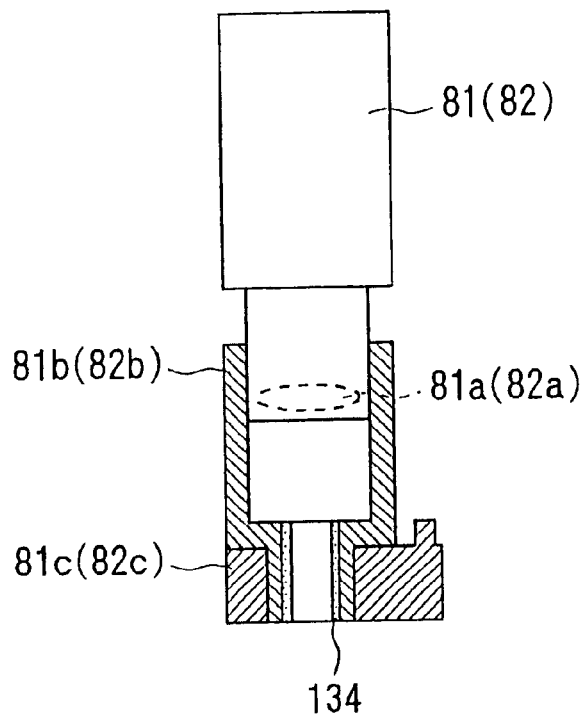

As shown in FIG. 28, an suction member 134 made of, for example, an suction resin can be employed. To be more specific, the suction member 134 is provided on an inner periphery of the bottom opening of the lens hood 81*b* or 82*b* so as not to obstruct the view of the camera 81 or 82, which, in turn, prevents the scattered coolant from entering the lens hood 81*b* or 82*b* by absorbing it, thereby preserving the imaging capability.

Figure 29:
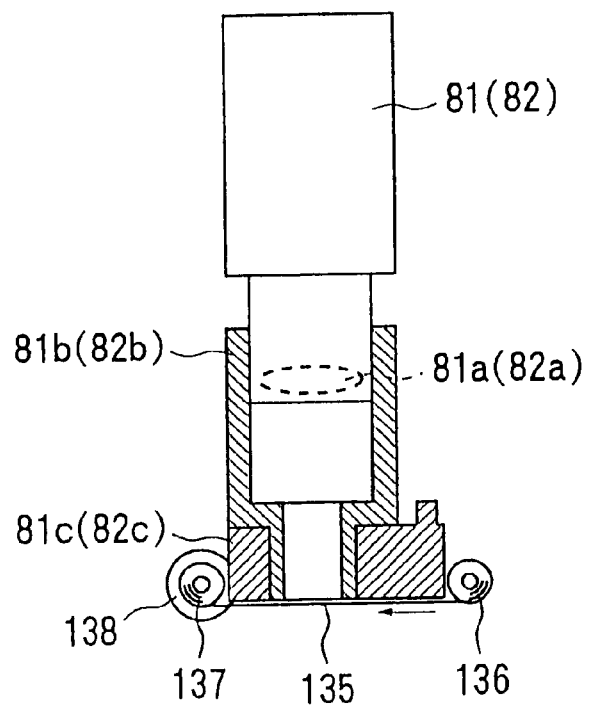

As shown in FIG. 29, a film transferring unit can be employed. The film transferring unit includes a transparent film 135 for blocking up the bottom opening of the lens hood 81*b* or 82*b*, a supply pulley 136 for supplying the transparent film 135, and a take-up pulley 137 for taking up the transparent film 135 from the supply pulley 136, the take-up pulley 137 being driven by a motor 138. The supply pulley 136 and a take-up pulley 137 are, respectively, installed at bottom of the lens hood 81*b* or 82*b* so that the transparent film 135 transferred thereby is allowed to block up the bottom opening of the lens hood 81*b* or 82*b*. This arrangement permits the transparent film 135 to prevent the scattered coolant from entering the lens hood 81*b* or 82*b* through the bottom opening thereof, thereby preserving the imaging capability. Further, since, when a portion of the transparent film 135 is contaminated by the coolant, the transparent film 135 can be moved by a predetermined distance by rotating the take-up pulley 137, instead of completely removing the transparent film 135. In this case, an suction pad for eliminating the scattered coolant from the transparent film 135 may be employed. By installing the suction pad at the take-up pulley side, when the transparent film 135 is transferred toward the take-up pulley 137, the coolant attached on the used portion of the transparent film 135 is absorbed by the suction pad, making it possible to reuse the transparent film 135. In addition, in order to rewind the transparent film 135 toward the supply pulley 136, another motor may be installed at the supply pulley side. Under this arrangement, by selectively driving the two motors, a predetermined portion of the transparent film 135 can be repeatedly used.

Figure 30:
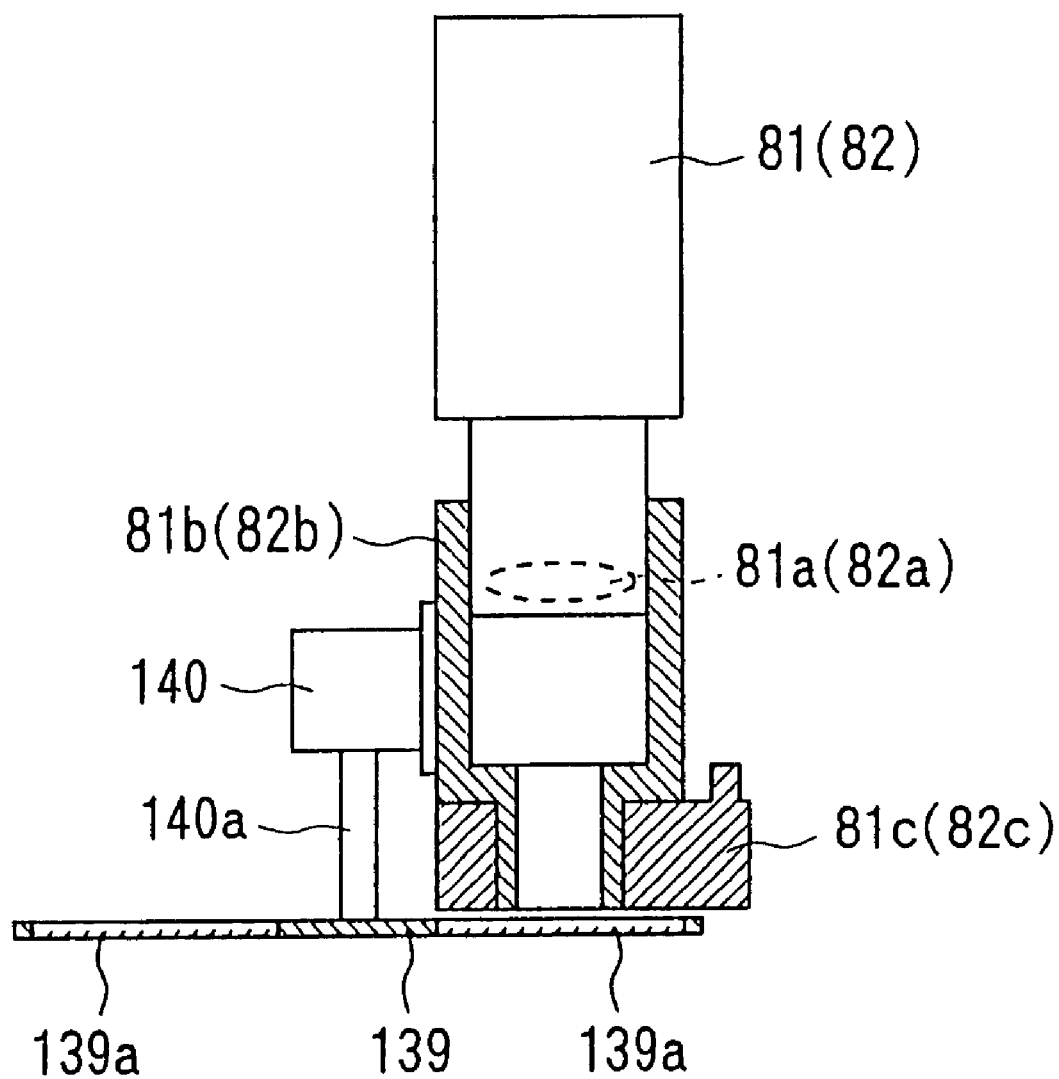

As shown in FIG. 30, a circular plate 139 having a plurality of filters 119*a* circumferentially, equally spaced apart can be employed. The circular plate 139 is rotatably installed by connecting its central portion to a motor shaft 140*a* of a motor 140 so that any one of filters 139*a* thereof blocks up the bottom opening of the lens hood 81*b* or 82*b*. Under this arrangement, the circular plate 139 and the filters 139*a* incorporated therein prevent the scattered coolant from entering the interior of the bottom opening of the lens hood 81*b* or 82*b*, again preserving the imaging capability. Further, when any one of the filters 139*a* is contaminated by the coolant, it can be replaced by another filter by simply rotating the circular plate 139 by a predetermine degree by driving the motor 140.

Between the dicing head 51 and the camera 81 or 82, a shielding plate (not shown) for blocking the scattered coolant, may be provided. The shielding plate blocks the coolant scattered from the dicing head 51 toward the camera 81 or 82, preventing the attachment of the scattered coolant. The shielding plate may be installed at a first sliding plate 67 and/or a second sliding plate 73 so as to move together, or may be fixedly provided at the casing of the device.

Figure 31:
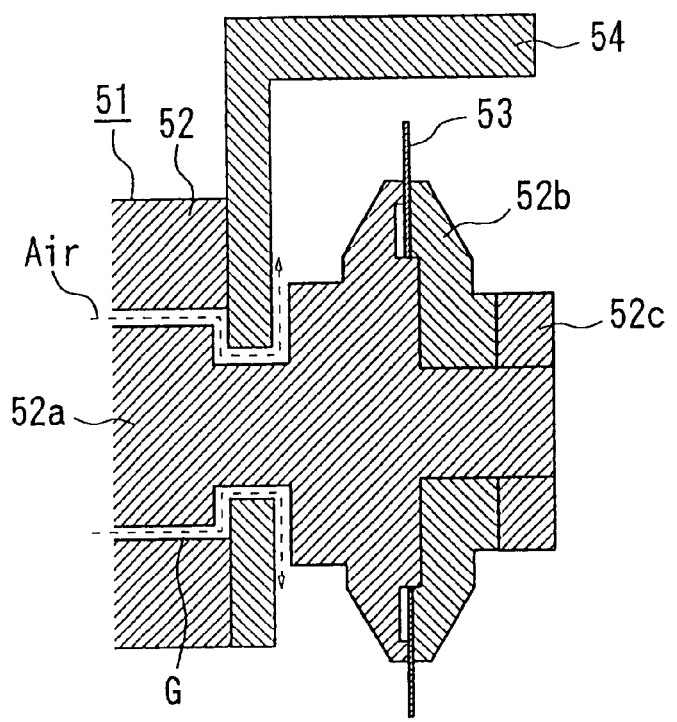
FIG. 31 shows a configuration for preventing machining remnants in the coolant from wearing a shaft.

There is shown in FIG. 31 a view of an arrangement for preventing the machining remnants in the coolant fed toward the blade during the dicing operation from coming into contact with a shaft of a spindle motor.

In FIG. 31, reference numbers 51, 52, 52*a*, 52*b*, 52*c*, 53, 54 are a dicing head, a spindle motor, a spindle motor shaft, a blade pressing member, a locking member, a disc-shaped blade, a blade cover, respectively. The spindle motor shaft 52*a* is rotatably installed within a housing of the spindle motor 52 through a thrust and a radial bearings. Between the housing of the spindle motor 52 and the spindle motor shaft 52*a*, and between the spindle motor shaft 52*a* and the blade cover 54, a bent gap G of, for example, about 1 mm is formed. Since the housing of the spindle motor 52 is formed with an intake port (not shown) connected with the air circuit having a compressor, valves, etc., by feeding the air into the housing of the spindle motor 52 through the intake port, the foregoing gap G can be made to function as an air bearing.

During the dicing operation, when the air is fed from the foregoing intake port into the housing of the spindle motor 52, the fed air flows around the spindle motor shaft 52*a* through the gap G and is ejected toward the blade 53. The ejected air prevents the scattered coolant from permeating between the spindle motor shaft 52*a* and the blade cover 54. To be more specific, the coolant fed during the dicing operation is scattered and the scattered coolant tends to permeate between the spindle motor shaft 52*a* and the blade cover, but the permeation of the scattered coolant is blocked by the air being ejected, as described above. Accordingly, it is possible to prevent the machining remnants in the foregoing scattered coolant from entering the gap G, preventing the abrasion of the spindle motor shaft 52*a*.

Figure 32:
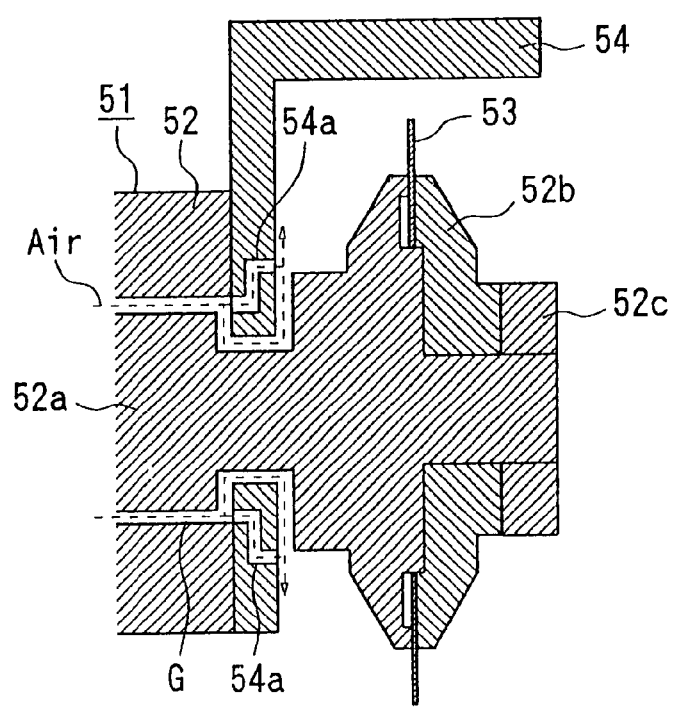
FIG. 32 is a modification of the configuration shown in FIG. 31.

Further, due to a lowering of the air pressure at vicinity of an opened end of the gap G, when the machining remnants are get attached on a portion at vicinity of the opened end of the gap G and are stuck thereon, as shown in FIG. 32, the blade cover 54 may be formed with a bypass passage 54*a*. The bypass passage has one end toward the opened end of the gap G so as to prevent the attachment of the machining remnants on the foregoing portion. Further, in order to obtain the same effect, the foregoing portion may be made of a porous material for allowing the air to flow therethrough.

Figure 33:
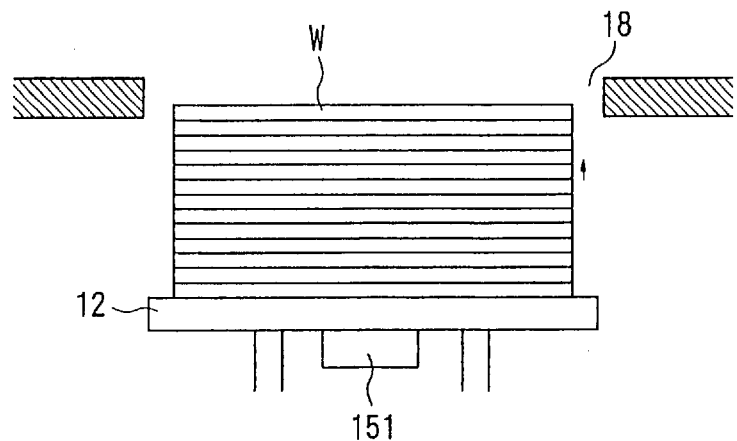
FIG. 33 offers a configuration for preventing more than two workpieces from being taken out at the same time by the suction head.

There is shown in FIG. 33 an arrangement for preventing two or more workpieces W from being sucked up by the suction head 2.

As shown, reference numerals 12, 18, W, 151 are, respectively, a lifting plate of the workpiece supplier 11, a drawing out port, workpiece, a vibrating source. The vibrating source 151 is provided at the lifting plate 12 so as to exert: fine vibration on the workpieces W disposed on the lifting plate 12. When the workpiece W is sucked up by the suction head 2, the vibrating source 151 exerts fine vibration on the workpieces W on the lifting plate 12. If an uppermost workpiece W, together with one or more workpieces therebelow is to be sucked up by the suction head 2, the vibrating source 151 is operated, which, in turn, separates the uppermost workpiece W from the workpieces therebelow, allowing the only uppermost workpiece W to be sucked up by the suction head 2.

Figure 34:
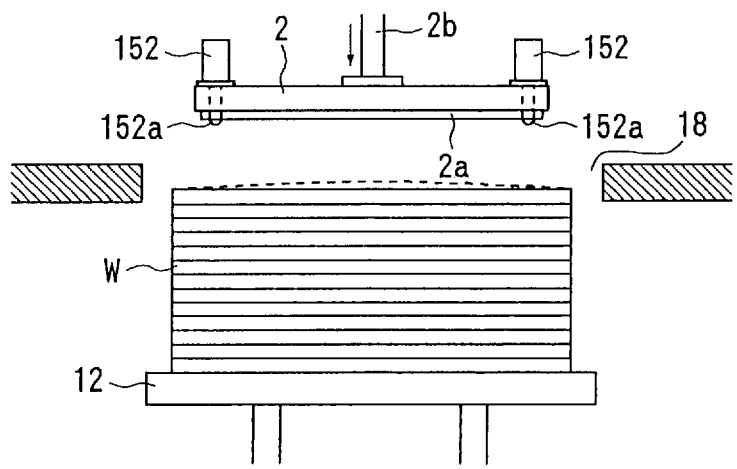
FIG. 34 sets forth a modification of the configuration shown in FIG. 33.

In order to prevent the uppermost workpiece W from being sticking to the other workpieces, other examples can be used. For example, FIG. 34 shows an example employing a plurality of cylinder assemblies, for example, two, installed along a periphery of the suction head 2 circumferentially, equally spaced apart from each other. As shown, each of the cylinder assemblies includes a cylinder 152 and a rod 152a slidable mounted to the cylinder 152 so as to slightly, downwardly, protrude from the a bottom surface of the suction head 2 (a bottom surface of the pad 2a). Before the uppermost workpiece W is sucked up by the suction head 2, the rods 152a are slightly protruded from the bottom surface of the suction head 2. Under this condition, the uppermost workpiece W is sucked up by the suction head 2. In this case, since, due to the protruding rods 152a, the uppermost workpiece W is bent as indicated by a dotted line, allowing it to be separated from one or more workpieces therebelow. When only the uppermost workpiece W is stuck to the suction head 2, the rods 152a return to their initial positions, allowing the uppermost workpiece W to be stably stuck onto the suction head 2. Accordingly, it is possible to separate the uppermost workpiece W from the workpieces therebelow.

Figure 35:
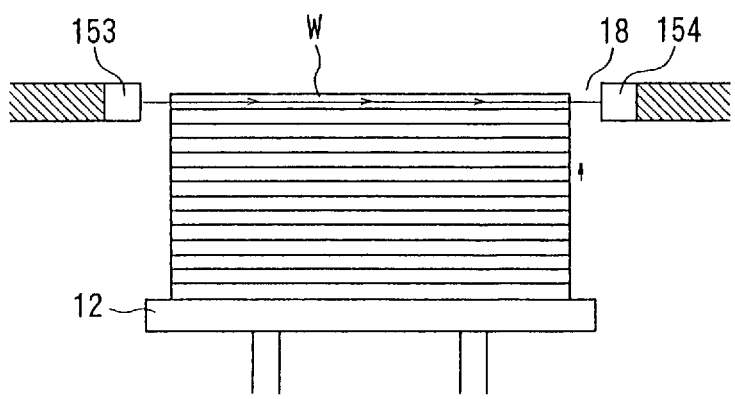
FIG. 35 shows a configuration for detecting the suction head taking out more than two workpieces at the same time.

There is shown in FIG. 35 an arrangement for detecting whether the uppermost workpiece W is sucked up or not. As shown, the detecting arrangement includes an optic switch having El light emitter 153 and a light receiver 154. The optic switch is provided at the drawing out port 18 at an identical level as a location that at which the uppermost workpiece W is to be sucked up so as to detect the only uppermost workpiece W. Under this arrangement, when the lifting plate 12 elevates the uppermost workpiece W up to the foregoing location, the suction head 2 applies a suction pressure on and retains the uppermost workpiece W, allowing the optic switch to output a detecting signal. Accordingly, it is possible to predetermine whether the uppermost workpiece W is sucked up or not. Thereafter, in order to elevate another workpiece W up to the foregoing location, the lifting plate 12 moves upwardly. At this time, if two or more workpieces W are sucked up by the suction head 2 at the immediately previous step, the optic switch remains "on". This will allow the operator to stop the operation and make a necessarily adjustment or arrangement.

While the present invention has been described with respect to certain preferred embodiments only, other modifications and variations may be made without departing from the scope of the present invention as set forth in the following claims.

What is claimed is:

1. A dicing apparatus comprising:
   a first station for feeding a workpiece before dicing;
   a movable machining table capable of retaining the workpiece;
   a second station for mounting the workpiece before dicing on the machining table;
   a third station for washing diced workpiece;
   a fourth station for retaining the diced workpiece;
   a dicing mechanism provided at a dicing range spaced apart from the second station, for dicing the workpiece; and
   a transferring mechanism for transferring the workpiece from the first station to the second station, from the second station to the third station, from the third station to the fourth station, respectively;
   wherein the first to the fourth stations are disposed so as to be circumferentially, equally spaced apart from each other by 90 degrees, and
   the workpiece transferring mechanism includes
   a T-shaped rotating arm having three branches,
   a shaft disposed at its central portion for pivoting the rotating arm, each branch of the rotating arm being provided with a suction head for holding the workpiece, and
   an actuator for reciprocating the rotating arm between a first position where the three workpiece suction heads attached to the branches of the rotating arm correspond to the first, the second and the third stations, respectively, and a second position where the three workpiece suction heads attached to the branches of the rotating arm correspond to the second, the third and the fourth stations, respectively.

2. The dicing apparatus of claim 1, wherein each branch of the rotating arm includes an actuator for vertically moving and horizontally rotating its corresponding suction head.

3. The dicing apparatus of claim 1, wherein the dicing mechanism includes a dicing head having a rotating blade and an actuator for moving the dicing head in a vertical direction and in a direction perpendicular to a direction in which the movable machining table moves.

4. The dicing apparatus of claim 1, further comprising a first lifting plate mounted at the first station and stacked with the workpieces to be diced, a feeder having an actuator for moving the lifting plate in a vertical direction, a second lifting plate mounted at the fourth station and stacked with the washed workpieces, and a retainer for retaining the workpieces, the retainer having an actuator for moving the second lifting plate in a vertical direction.

5. The dicing apparatus of claim 1, further comprising a washer provided at the third station, for washing the workpiece thereon, the workpiece washer including a turn table for mounting the diced workpiece thereon, an actuator for rotating the turn table and a washing liquid feeder for spraying a washing liquid toward the turn table.

6. A dicing apparatus of claim 1, further comprising:
   a coolant feeder for feeding a coolant to a working place;
   at least one discharging member provided at the machining table, for discharging the coolant together with machining remnants, the discharging member having a discharging port; and
   an eliminator for moving the machining remnants remaining at bottom of the discharging member toward the discharging port of the discharging member.

7. The dicing apparatus of claim 6, further comprising a table moving mechanism for moving the machining table in a predetermined direction, wherein the discharging member has a length corresponding to an extent to which the machining table move.

8. The dicing apparatus of claim 7, further comprising at least two waterproofing covers provided at both two sides of the machining table so as to cover the table moving mechanism, each of the waterproofing covers being capable of expanding and contracting depending on a displacement of the machining table.

9. The dicing apparatus of claim 6, wherein the eliminator includes a spiral brush installed at an inner side of the discharging member and an actuator for rotating the spiral brush in a discharge promoting direction.

10. The dicing apparatus of claim 6, wherein the eliminator includes a chip sample plate provided at an inner side of the discharging member so as to be movable together with the machining table.

11. The dicing apparatus of claim 6, wherein the eliminator includes a brush provided at an inner side of the discharging member so as to be movable together with the machining table, the brush having a cylindrical shape or a spherical shape.

12. A dicing apparatus of claim 1, further comprising;

a camera for detecting a position of the workpiece by imaging the workpiece on the machining table; and a coolant feeder for feeding a coolant to a working place, wherein the camera is provided with a cylindrical lens hood having an opening and at its circumference an intake port, the intake port being connected to an air feeding source for feeding an air from the intake port to an interior of the lens hood and ejecting the air from the opening of the lens hood to outside.

13. The dicing apparatus of claim 12, further comprising a shutter for selectively blocking up the opening of the lens hood and an actuator for driving the shutter.

* * * * *

UNITED STATES PATENT AND TRADEMARK OFFICE
Certificate

Patent No. 6,358,115                                                       Patented: March 19, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Shigemitsu Koike, Tokyo, Japan; Masayuki Inai, Tokyo, Japan; Hirokazu Kobayashi, Tokyo, Japan; Toshimichi Shimizu, Tokyo, Japan; Shin Chih Liaw, Taiwan, Republic of China; Chun Chang Hung, Taiwan, Republic of China; and Yung Kuang Liu, Taiwan, Republic of China.

Signed and Sealed this Tenth Day of December 2002.

JOSEPH J. HAIL III
*Supervisory Patent Examiner*
Art Unit 3723